United States Patent
Zorgui et al.

(10) Patent No.: US 12,468,007 B2
(45) Date of Patent: Nov. 11, 2025

(54) TIMING ERROR ESTIMATION

(71) Applicant: QUALCOMM Incorporated, San Diego, CA (US)

(72) Inventors: Marwen Zorgui, San Diego, CA (US); Xiaoxia Zhang, San Diego, CA (US); Srinivas Yerramalli, San Diego, CA (US); Mohammed Ali Mohammed Hirzallah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 18/051,782

(22) Filed: Nov. 1, 2022

(65) Prior Publication Data
US 2024/0142562 A1    May 2, 2024

(51) Int. Cl.
*H04W 24/10* (2009.01)
*G01S 5/02* (2010.01)
*H04B 17/364* (2015.01)

(52) U.S. Cl.
CPC ........ *G01S 5/02525* (2020.05); *H04B 17/364* (2015.01); *H04W 24/10* (2013.01)

(58) Field of Classification Search
CPC .. G01S 5/02525; G01S 5/0244; G01S 5/0278; G01S 5/021; H04B 17/364; H04W 24/10; H04W 64/00; G06N 20/00
See application file for complete search history.

(56) References Cited

U.S. PATENT DOCUMENTS

2021/0368338 A1* 11/2021 Lord ..................... H04W 64/00
2022/0046386 A1*  2/2022 Sundararajan ........ H04W 4/029

FOREIGN PATENT DOCUMENTS

WO    2022031687 A1    2/2022

OTHER PUBLICATIONS

International Search Report and Written Opinion—PCT/US2023/073732—ISA/EPO—Jan. 2, 2024.
Qualcomm Incorporated: "Other Aspects on AI-ML for Positioning Accuracy Enhancement", 3GPP TSG RAN WG1 #109-e, R1-2205029, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052144138, 16 pages, p. 10, lines 2-8, 11-13, 16, 19-21, 24-26, 28-29, 32-33, Par. 4.1, Par. 4.2, Par. 4.2.1, Par. 4.2.2, Par. 6.1, figure 1.

(Continued)

*Primary Examiner* — Chuong A Ngo
(74) *Attorney, Agent, or Firm* — SUNSTEIN LLP

(57) ABSTRACT

A signal time delay estimation method includes: obtaining, at an apparatus, a plurality of RFFPs (radio frequency fingerprints) each based on a plurality of signal measurements of respective signals transferred between respective ones of a plurality of wireless signal transfer devices; obtaining, at the apparatus, a plurality of locations corresponding to the plurality of wireless signal transfer devices; and implementing, at the apparatus, a machine-learning algorithm to provide at least one first indication of at least one first signal time delay to convert between a first wireless signal at a target device, of the plurality of wireless signal transfer devices, and a first baseband signal at the target device based on the plurality of RFFPs and the plurality of locations.

30 Claims, 11 Drawing Sheets

(56) References Cited

OTHER PUBLICATIONS

Ye X., et al., "Neural-Network-Assisted UE Localization Using Radio-Channel Fingerprints in LTE Networks", IEEE Access, vol. 5, Jun. 5, 2017 (Jun. 5, 2017), pp. 12071-12087, XP011657091, DOI: 10.1109/ACCESS.2017.2712131, [Retrieved on Jul. 18, 2017] pp. 12080-12084, sections A and B.

* cited by examiner

TIMING ERROR ESTIMATION

FIELD OF THE DISCLOSURE

The field of the disclosure is timing error parameter estimation and more particularly estimation of signal time delay between a wireless signal and a baseband signal at wireless signal transfer device.

DESCRIPTION OF RELATED ART

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

In timing-based positioning techniques, timing errors may affect performance significantly. For example, the 3GPP Technical Specification 38.305 defines two main timing errors, Tx (transmission) time delay and Rx (reception) time delay. From a signal transmission perspective, the Tx time delay is the time delay from the time when the digital signal is generated at baseband to the time when an RF (radio frequency) signal is transmitted from the Tx antenna. From a signal reception perspective, the Rx time delay is the time delay from the time when an RF signal arrives at the Rx antenna to the time when the signal is digitized and timestamped at the baseband. The Tx and Rx time delays may affect both a UE (user equipment) and a TRP (transmission/reception point).

Depending on the positioning technique (e.g., DL-TDOA (Downlink Time Difference of Arrival), UL-TDOA (Uplink TDOA), m-RTT (multi-Round-Trip-Time), one or both delays may affect position estimation performance. Time delay compensation errors may be mitigated by reporting indications of the antenna panel/signal processing chains through which RF signal measurements are taken. For example, Tx TEG ID (Timing Error Group Identity), Rx TEG ID, and RxTx TEG ID may be reported. While the delay introduced by a reported panel/chain may not be known, an entity may determine whether different measurements were performed using the same panel/chain or different panels and/or different chains.

SUMMARY

An example apparatus includes: a receiver; a memory; and a processor, communicatively coupled to the receiver and the memory, configured to: obtain a plurality of RFFPs (radio frequency fingerprints) each based on a plurality of signal measurements of respective signals transferred between respective ones of a plurality of wireless signal transfer devices; obtain a plurality of locations corresponding to the plurality of wireless signal transfer devices; and implement a machine-learning algorithm to provide at least one first indication of at least one first signal time delay to convert between a first wireless signal at a target device, of the plurality of wireless signal transfer devices, and a first baseband signal at the target device based on the plurality of RFFPs and the plurality of locations.

An example signal time delay estimation method includes: obtaining, at an apparatus, a plurality of RFFPs (radio frequency fingerprints) each based on a plurality of signal measurements of respective signals transferred between respective ones of a plurality of wireless signal transfer devices; obtaining, at the apparatus, a plurality of locations corresponding to the plurality of wireless signal transfer devices; and implementing, at the apparatus, a machine-learning algorithm to provide at least one first indication of at least one first signal time delay to convert between a first wireless signal at a target device, of the plurality of wireless signal transfer devices, and a first baseband signal at the target device based on the plurality of RFFPs and the plurality of locations.

Another example apparatus includes: means for obtaining a plurality of RFFPs (radio frequency fingerprints) each based on a plurality of signal measurements of respective signals transferred between respective ones of a plurality of wireless signal transfer devices; means for obtaining a plurality of locations corresponding to the plurality of wireless signal transfer devices; and means for implementing a machine-learning algorithm to provide at least one first indication of at least one first signal time delay to convert between a first wireless signal at a target device, of the plurality of wireless signal transfer devices, and a first baseband signal at the target device based on the plurality of RFFPs and the plurality of locations.

An example non-transitory, processor-readable storage medium includes processor-readable instructions to cause a processor of an apparatus to: obtain a plurality of RFFPs (radio frequency fingerprints) each based on a plurality of signal measurements of respective signals transferred between respective ones of a plurality of wireless signal transfer devices; obtain a plurality of locations corresponding to the plurality of wireless signal transfer devices; and implement a machine-learning algorithm to provide at least one first indication of at least one first signal time delay to convert between a first wireless signal at a target device, of the plurality of wireless signal transfer devices, and a first baseband signal at the target device based on the plurality of RFFPs and the plurality of locations.

In an embodiment, an ML-based RxTx Time Delay estimation method runs on a network (NW), where an output of an ML model is an RxTx time delay estimate of a target TRP and inputs are: radio fingerprints constructed from a set of measurements obtained from one or more assisting UE nodes, corresponding to DL reference signals sent by the target TRP; radio fingerprints constructed from a set of measurements obtained from the target TRP, corresponding to UL reference signals sent by the one or more assisting UE nodes; a position and a calibrated Rx-Tx value of each assisting UE node of the one or more assisting UE nodes; and a location and an uncalibrated Rx-Tx value of the target TRP.

In an embodiment, an ML-based RxTx Time Delay estimation method runs on a network (NW), where an output of an ML model is an RxTx time delay estimate of a target UE and inputs are: radio fingerprints constructed from a set of measurements obtained from the target UE, corresponding to DL reference signals sent by one or more assisting TRP nodes; radio fingerprints constructed from a set of measurements obtained from the assisting TRP nodes, corresponding to UL reference signals sent by the target UE; a position and a calibrated Rx-Tx value of each assisting TRP node of the one or more assisting TRP nodes; and a location and an uncalibrated Rx-Tx value of the target UE.

In an embodiment, an ML-based Tx Time Delay estimation method runs on a network (NW), where an output of an ML model is a TRP Tx time delay estimate and inputs are: radio fingerprints (RFFPs) constructed from a set of measurements obtained from a UE, corresponding to DL reference signals sent by a set of synchronized assisting TRPs, one of the TRPs being the target TRP with unknown Tx Timing Delay; TRP location and TRP Tx Time Delay for each assisting TRP; a target TRP location; and a UE location.

In an embodiment, an ML-based Tx Time Delay estimation method runs on a network (NW), where an output of an ML model is a UE Tx time delay estimate and inputs are: radio fingerprints (RFFPs) constructed from a set of measurements obtained from a TRP, corresponding to UL reference signals sent by a set of synchronized assisting UEs, one of the UEs being the target UE with unknown Tx Timing Delay; UE location and UE Tx Time Delay for each assisting UE; a target UE location; and a TRP location.

In an embodiment, an ML-based Rx Time Delay estimation method runs on a network (NW), where an output of an ML model is a TRP Rx time delay estimate of a node and inputs are: radio fingerprints (RFFPs) constructed from a set of measurements obtained from a set of synchronized TRPs, one of the TRPs being the target TRP with unknown Rx Timing Delay, corresponding to UL reference signal sent by the UE; a TRP location and a TRP Rx Time Delay for each assisting TRP; a Target TRP location; and a UE location.

In an embodiment, an ML-based Rx Time Delay estimation method runs on a network (NW), where an output of an ML model is a UE Rx time delay estimate of a node and inputs are: radio fingerprints (RFFPs) constructed from a set of measurements obtained from a set of synchronized UEs, one of the UEs being the target UE with unknown Rx Timing Delay, corresponding to DL reference signal sent by the TRP; a UE location and a UE Rx Time Delay for each assisting UE; a Target UE location; and a TRP location.

DETAILED DESCRIPTION

Figure 1:
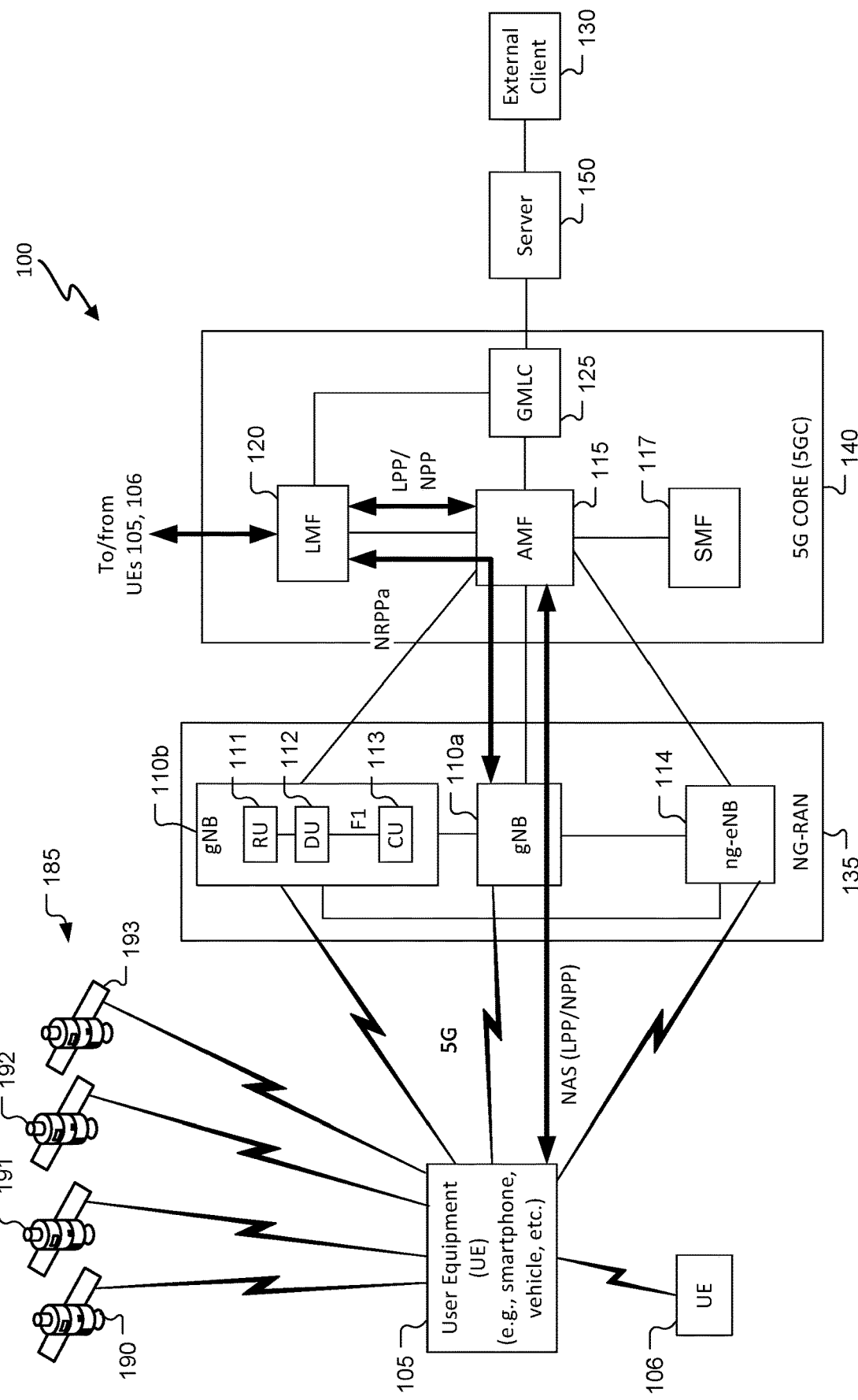
FIG. 1 is a simplified diagram of an example wireless communications system.

Techniques are discussed herein for machine-learning-based (ML-based) timing delay estimation. For example, RxTx time delays, Tx time delays, and/or Rx time delays may be estimated using a machine learning algorithm. Radio frequency fingerprints may be obtained from measurements of one or more signals transferred between wireless signal transfer devices (including a timing delay target device and one or more assistance device) and used in conjunction with locations of the wireless signal transfer devices to estimate the timing delay(s) of the timing delay target device. Timing delay(s) of the assistance device(s) may be input to the ML algorithm to determine absolute timing delay(s) of the timing delay target device. Timing delay(s) of the assistance device(s) may not be input to the ML algorithm to determine relative timing delay(s) of the timing delay target device relative to a reference device, but may be input to the ML algorithm to improve accuracy of the determined relative timing delay(s). The estimated timing delay(s) of the timing delay target device may be shared to help improve position estimation accuracy based on signal transfer between the timing delay target and a positioning target device. These techniques are examples, and other techniques may be implemented.

Items and/or techniques described herein may provide one or more of the following capabilities, as well as other capabilities not mentioned. Time delay estimation accuracy may be improved. Time delay estimation for a timing delay target device may adapt to changes in the timing delay(s) of the timing delay target device, e.g., due to one or more changing conditions affecting time delay(s) of the timing delay target device, e.g., age of the timing delay target device, change in temperature, change in pressure, and/or change in other weather conditions encountered by the timing delay target device. Positioning estimation accuracy may be improved, e.g., by sharing estimated time delay(s) for a timing delay target device used as reference device for positioning and using the shared estimated time delay(s) to determine signal timing and thus range between the reference device and a positioning target device, and thus a position estimate of the positioning target device. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both.

Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used.

Other UEs may include wearable devices (e.g., smart watches, smartjewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct device-to-device communications (without going through a network) may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem.

An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level).

Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g., the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114.

The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105.

For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105.

The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method).

In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125.

In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
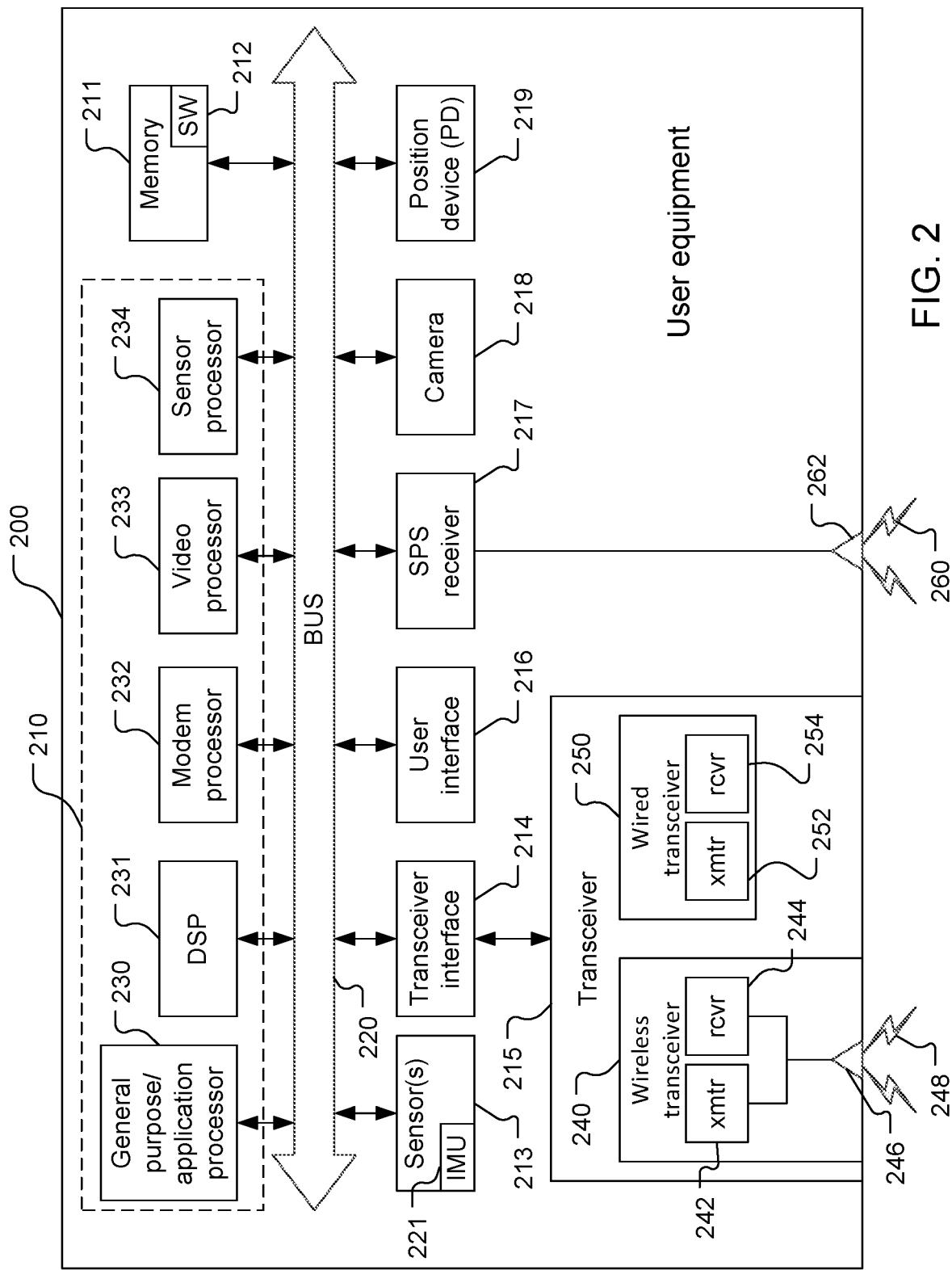
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An IMU 221 (inertial measurement unit) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200.

For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU 221 may be configured to provide measurements about a direction of motion and/or a speed of motion of the UE 200, which may be used in relative location determination. For example, one or more accelerometers and/or one or more gyroscopes of the IMU 221 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical)

signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260.

The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217.

The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200.

The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
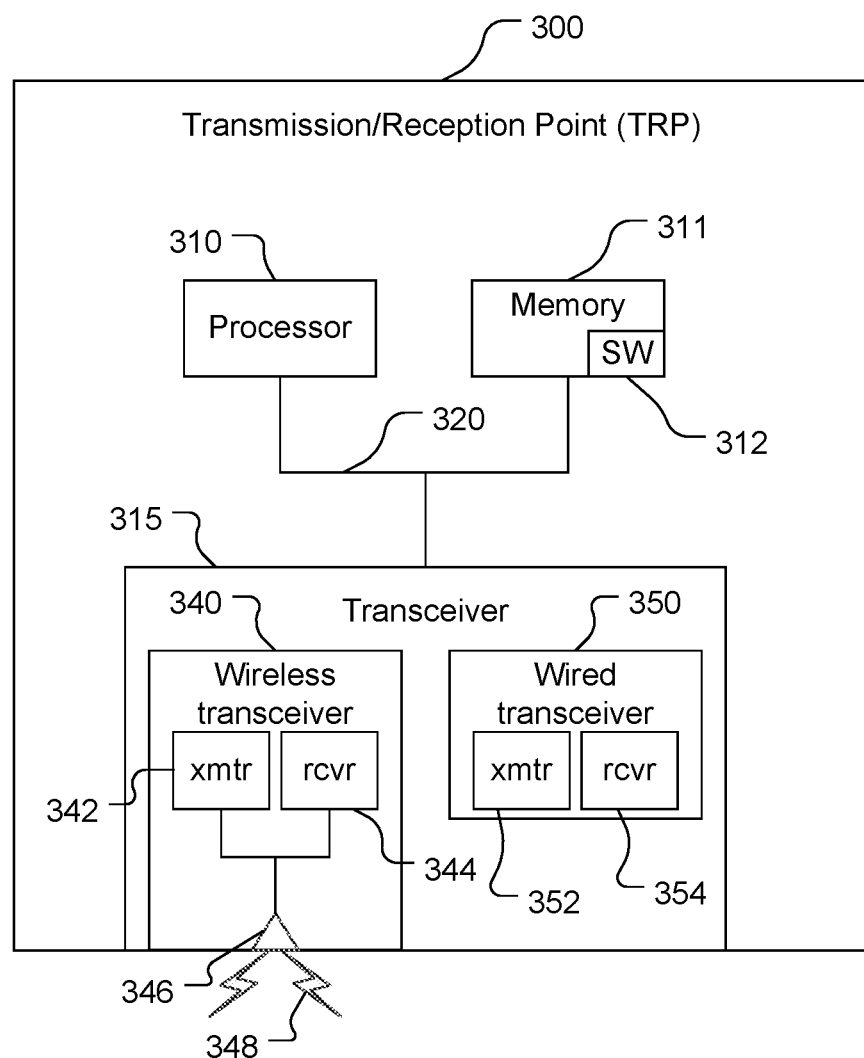
FIG. 3 is a block diagram of components of an example transmission/reception point.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
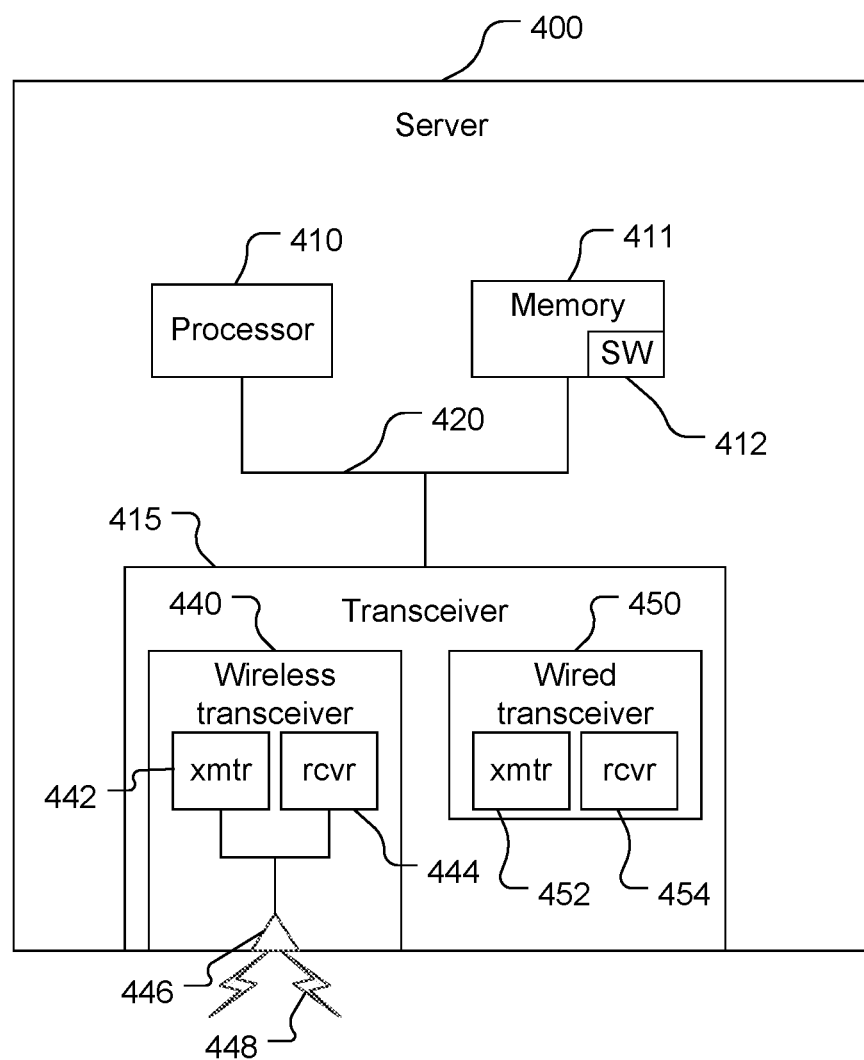
FIG. 4 is a block diagram of components of an example server, various embodiments of which are shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information.

Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, and subtracting the $UE_{Rx\text{-}Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5GNR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Timing Error Estimation

Artificial intelligence/machine learning (AI/ML) has been identified as having great potential for improving position estimation. ML-based positioning techniques have been shown to provide superior positioning performance when compared to classical positioning schemes, especially in NLOS (Non-Line-Of-Sight) conditions. Radio frequency fingerprinting (RFFP)-based positioning is an ML positioning technique that utilizes RF fingerprints (RF signal measurements, e.g., channel impulse response (CIR), channel frequency response (CFR), RSRP, etc.) captured by one or more mobile devices and/or one or more network devices (e.g., TRPs) to determine a location estimate of a target device. RFFP-based positioning has been proposed for many scenarios including UE-based positioning, UE-assisted positioning, UE SL-positioning, joint UE positioning (determining position estimates of multiple UEs). For example, variations on bandwidth and TRP for RFFP UE positioning may be implemented, RFFP-based positioning for a single TRP may be implemented, and/or RFFP-based positioning for multi-TRP positioning may be implemented.

Machine-learning-based techniques are discussed herein for estimating timing errors. Timing errors such as Rx-Tx time delay (a sum of the Rx time delay and the Tx time delay, and which may also be called RxTx time delay), Tx time delay, Rx time delay, relative Tx time delay (of a target device relative to a reference device), and/or relative Rx time delay may be estimated. Estimated timing error(s) may be determined and shared for use in improving position estimation. For example, an estimated time delay may be provided to mobile devices for use in positioning with a device whose estimated time delay was shared, e.g., for transferring positioning signals with the device whose estimated time delay was shared.

Figure 5:
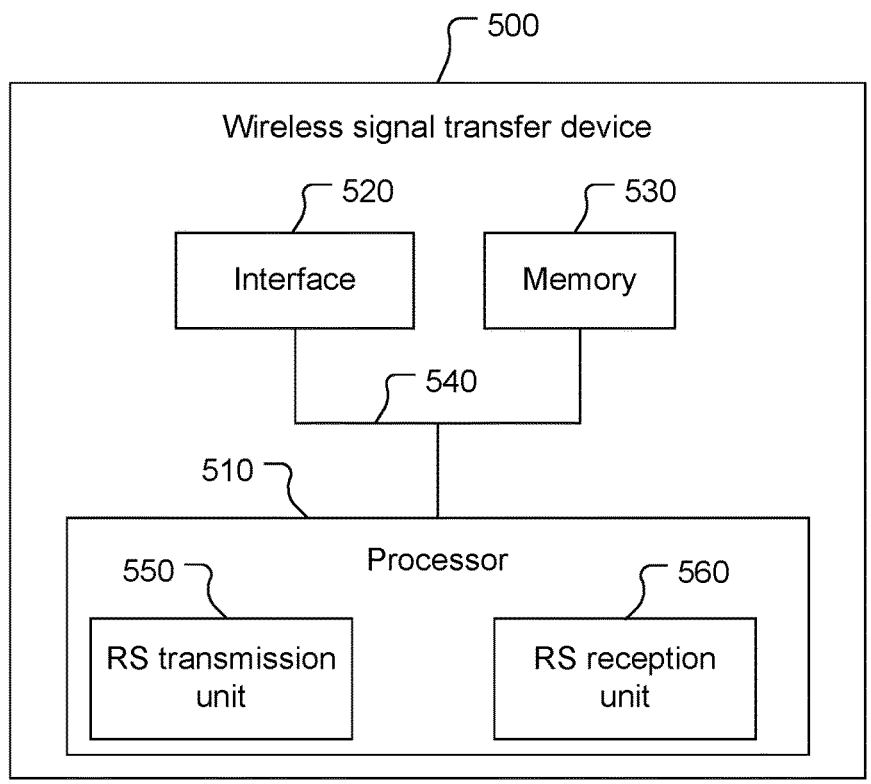
FIG. 5 is a block diagram of an example wireless signal transfer device.

Referring to FIG. 5, with further reference to FIGS. 1-3, a wireless signal transfer device 500 includes a processor 510, an interface 520, and a memory 530, communicatively coupled to each other by a bus 540. The device 500 may take any of a variety of forms such as a mobile device, a UE such as a vehicle UE (VUE), a TRP, etc. The device 500 may include the components shown in FIG. 5, and may include one or more other components such as any of those shown in FIG. 2 such that the device 200 may be an example of the device 500, or any of the components shown in FIG. 3 such that the TRP 300 may be an example of the device 500. For example, the processor 510 may include one or more of the components of the processor 210 or the processor 310. The interface 520 may include one or more of the components of the transceiver 215, e.g., the wireless transmitter 242 and the antenna 246, or the wireless receiver 244 and the antenna 246, or the wireless 242, the wireless receiver 244, and the antenna 246. Also or alternatively, the transceiver interface 520 may include the wired transmitter 252 and/or the wired receiver 254. As another example, the interface 520 may include one or more of the components of the transceiver 315, e.g., the wireless transmitter 342 and the antenna 346, or the wireless receiver 344 and the antenna 346, or the wireless transmitter 342, the wireless receiver 344, and the antenna 346. Also or alternatively, the interface 520 may include the wired transmitter 352 and/or the wired receiver 354. The interface 520 may include multiple antenna panels and/or multiple receive chains (for receiving and converting wireless signals into baseband signals and measuring the baseband signals) and/or multiple transmit chains (for converting baseband signals into transmitted wireless signals). The memory 530 may be configured similarly to the memory 211 or the memory 311, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the device 500 performing a function as shorthand for one or more appropriate components (e.g., the processor 510 and the memory 530) of the device 500 performing the function. The processor 510 (possibly in conjunction with the memory 530 and, as appropriate, the interface 520) may include an RS transmission unit 550 and/or an RS reception unit 560. The RS transmission unit 550 and the RS reception unit 560 may be configured, respectively, to transmit reference signals and to receive and measure reference signals. The RS transmission unit 550 and the RS reception unit 560 are discussed further below, and the description may refer to the processor 510 generally, or the device 500 generally, as performing any of the functions of the RS transmission unit 550 or the RS reception unit 560, with the device 500 being configured to perform the functions.

Figure 6:
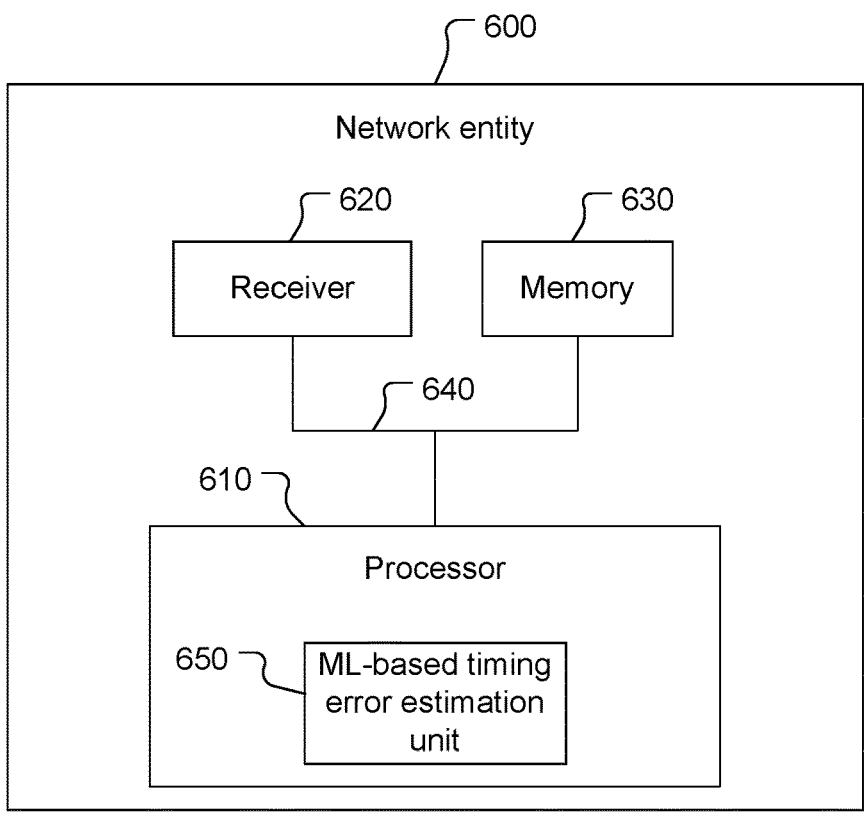
FIG. 6. is a simplified diagram of a network entity.

Referring also to FIG. 6, with further reference to FIG. 4, a network entity 600 includes a processor 610, a receiver 620, and a memory 630, communicatively coupled to each other by a bus 640. The network entity 600 may take any of a variety of forms such as a TRP, a server, an LMF, etc. The network entity 600 may include the components shown in FIG. 6, and may include one or more other components. The TRP 300 may be an example of the network entity 600 and/or the server 400 may be an example of the network entity 600. For example, the receiver 620 may include the wireless receiver 344 and the antenna 346, and/or may include the wired receiver 354. As another example, the receiver 620 may include the wireless receiver 444 and the antenna 446, and/or may include the wired receiver 454. The network entity 600 may include other components such as the wireless transmitter 342 and the antenna 346, and/or the wired transmitter 352, or the wireless transmitter 442 and the antenna 446, and/or the wired transmitter 452. The memory 530 may be configured similarly to the memory 311 or the memory 411, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the receiver 620) may include an ML-based (machine-learning-based) timing error estimation unit 650. The ML-based timing error estimation unit 650 may be configured to implement an ML algorithm to estimate one or more timing errors of a target device (e.g., a UE or a TRP). The ML-based timing error estimation unit 650 is discussed further below, and the description may refer to the processor 610 generally, or the network entity 600 generally, as performing any of the functions of the ML-based timing error estimation unit 650, with the network entity 600 being configured to perform the functions.

Figure 7:
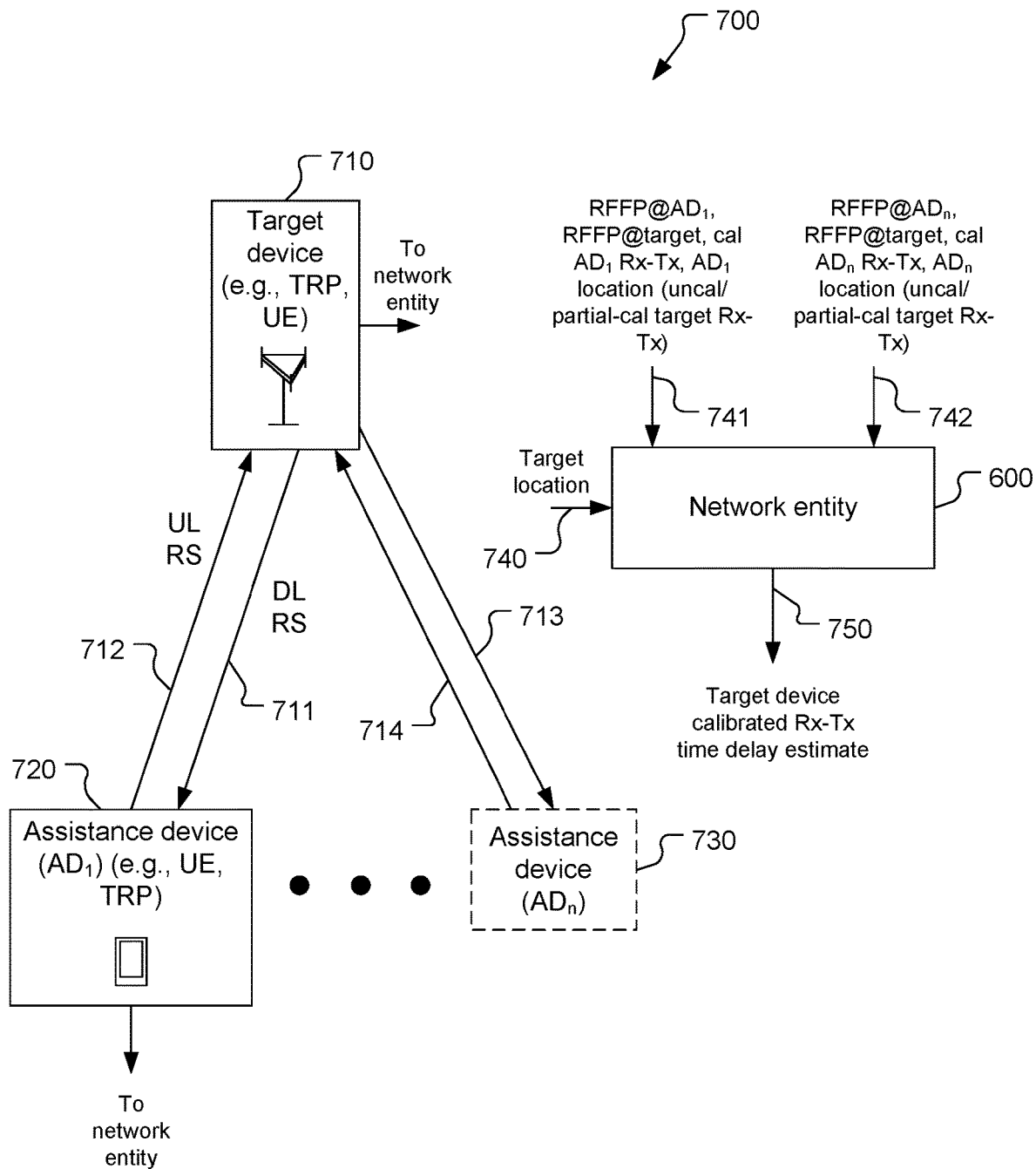
FIG. 7 is a block diagram of an environment for determining an Rx-Tx time delay of a target device.

Referring also to FIG. 7, an environment 700 for determining an Rx-Tx time delay of a target device includes multiple wireless signal transfer devices, here a target device 710, an assistance device 720, possibly one or more other assistance devices up to an $n^{th}$ assistance device 730, and the network entity 600. The assistance device 720, or any other assistance device, e.g., the assistance device 730, may comprise a PRU (Positioning Reference Unit). The Rx-Tx time delay of the target device 710 is unknown (although an uncalibrated Rx-Tx time delay and/or a partially-calibrated Rx-Tx time delay may be known). The focus of the discussion herein is the assistance device 720, but the discussion applies to other assistance devices, e.g., the assistance device 730. In this example, an ML-based Rx-Tx time delay estimation method may be run on the network entity 600 where an output of an ML model implemented by the network entity 600, e.g., the ML-based timing error estimation unit 650, is an Rx-Tx time delay estimate of the target device 710. The target device 710 and the assistance device 720, and any other assistance device, may be any of a variety of forms of devices, e.g., a UE or a TRP, and different assistance devices may be different forms of devices.

The target device 710, the assistance device 720, and the other assistance devices, if any, may be examples of the device 500 with the interface 520 comprising a transceiver configured to transmit wireless signals from the device 500 and to receive wireless signals at the device 500. The target device 710 and the assistance device 720 may be configured to transmit RS signals in accordance with instructions from the RS transmission unit 550 and to receive and measure RS signals by and in accordance with the RS reception unit 560. For example, the RS transmission unit 550 may cause the interface 520 to transmit a DL-RS (downlink reference signal) or a UL-RS (uplink reference signal), e.g., depending on a form of the transmitting assistance device and a form of the target device, and whether the transmitting device is an assistance device or the target device 710. For example, if the target device 710 is a TRP and the assistance device 720 is a UE, then the RS transmission unit 550 of the target device 710 may cause the interface 520 to transmit DL-RS 711, 713, the RS transmission unit 550 of the assistance device 720 may cause the interface 520 to transmit a UL-RS 712, and the RS transmission unit 550 of the assistance device 730 may cause the interface 520 to transmit a UL-RS 714 as shown in FIG. 7. The DL-RS 711, 713 may comprise PRS, SSB (Synchronization Signal Block), DMRS (Demodulation Reference Signal), etc. The UL-RS 712, 714 may comprise SRS, SRS-p (SRS for positioning), DMRS, etc. The RS reception unit 560 of each of the target device 710 and the assistance device 720 may be configured to measure respective received RS, e.g., to determine an RFFP. The RFFP may comprise one or more signal measurements such as CIR, CFR, RSRQ, RSRP, delay spread, angle spread, AoA angle (as appropriate), AoD angle (as appropriate), and/or Doppler spread, etc., or any combinations captured at one or more antenna ports.

The target device 710 and the assistance device 720 may be configured to provide information to the network entity 600, e.g., via wireless communication and/or wired communication directly and/or through one or more intermediaries, e.g., a TRP. The target device 710 and the assistance device 720 may each, for example, provide respective RFFP data (e.g., respective signal measurements) and a respective location to the network entity 600. The target device 710 and/or the assistance device 720 may provide a confidence value and/or uncertainty range for the corresponding location. The assistance device 720 may provide a calibrated Rx-Tx time delay for the assistance device 720 to the network entity 600, and may provide a confidence value and/or uncertainty range for the Rx-Tx time delay. The network entity 600 may provide an uncalibrated Rx-Tx time delay for the target device 710 and/or a partially-calibrated Rx-Tx time delay for the target device 710 to the network entity 600.

The network entity 600 may implement an ML algorithm to determine an Rx-Tx time delay estimate 750 for the target device 710 based on inputs including a location 740 of the target device 710 and one or more sets of inputs, e.g., inputs 741, 742, each corresponding to a respective assistance device. The inputs 741 may include one or more RFFPs constructed from a set of measurements obtained from the assistance device 720 corresponding to the DL-RS 711 sent by the target device 710 to the assistance device 720 and one or more RFFPs constructed from a set of measurements obtained from the target device 710 corresponding to the UL-RS 712 sent by the assistance device 720 to the target device 710. The inputs 741 may include a location of the assistance device 720 used to transfer RS with the target device 710 and construct the RFFPs, and the calibrated Rx-Tx time delay corresponding to the assistance device 720. The inputs 741 may include the uncalibrated Rx-Tx time delay of the target device 710 and/or the partially-calibrated Rx-Tx time delay of the target device 710. The inputs 741 may include any of the confidence level(s) and/or uncertainty range(s) of location or Rx-Tx time delay. The inputs 742 may be similar to the inputs 741, but for the assistance device 730. The locations of the target device 710 and the assistance device(s) 720, 730 may be obtained using one or more known techniques (e.g., GNSS trilateration, terrestrial-based trilateration, E-CID, etc., and/or a combination of two or more techniques). The ML-based timing error estimation unit 650 may use the location 740 and the inputs 741, 742 (e.g., the RFFPs, the locations, the calibrated Rx-Tx time delay(s) of the assistance device(s), and possibly the uncalibrated Rx-Tx time delay and/or the partially-calibrated Rx-Tx time delay of the target device 710 and possibly one or more confidence values and/or uncertainty ranges) in an ML algorithm to determine and output the Rx-Tx time delay estimate 750 corresponding to the target device 710 as a calibrated Rx-Tx time delay. The output is thus an Rx-Tx time delay which is a combination of the Rx time delay and the Tx time delay of the target device 710, each of which is a time delay to convert between a wireless signal at the target device 710 and a baseband signal at the target device 710. The Rx time delay is a time to convert from a received wireless signal to a baseband signal and the Tx time delay is a time to convert a baseband signal to a transmitted wireless signal. The use of more than one assistance device may improve the accuracy of the Rx-Tx time delay estimate determined for the target device 710.

Figure 8:
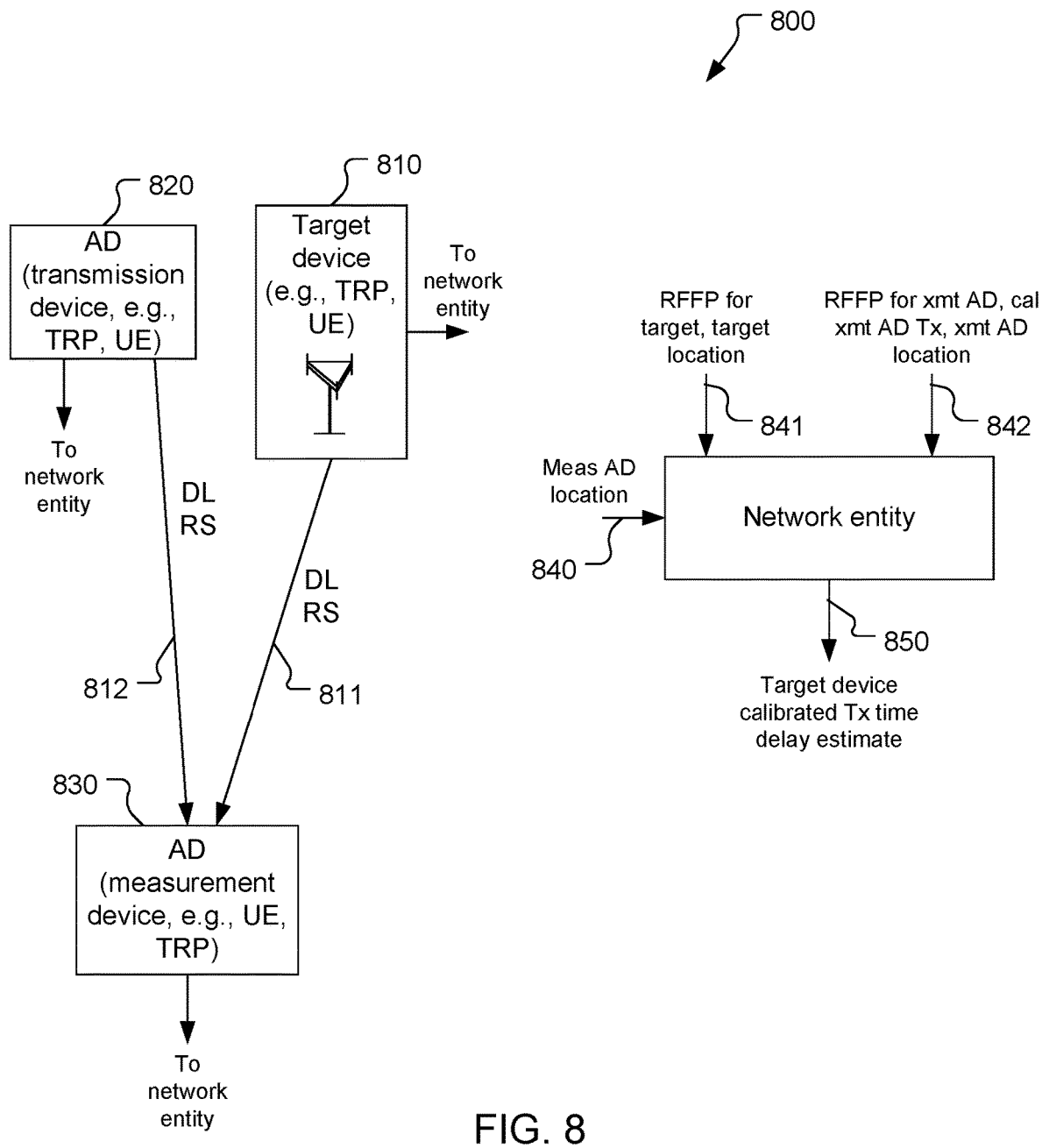
FIG. 8 is a block diagram of an environment for determining a Tx time delay of a target device.

Referring also to FIG. 8, an environment 800 for determining a Tx time delay of a target device includes multiple wireless signal transfer devices, here a target device 810, an assistance device 820 that is a transmission device, an assistance device 830 that is a measurement device, and the network entity 600. One or more of the assistance devices 820, 830 may each comprise a PRU. In this example, an ML-based Tx time delay estimation method may be run on the network entity 600 where an output of an ML model implemented by the network entity 600, e.g., the ML-based timing error estimation unit 650, is a Tx time delay estimate of the target device 810. A procedure may be used to determine the Tx time delay estimate that parallels a DL-TDOA procedure with a Tx time delay (e.g., of a TRP) being unknown. The target device 810, the assistance device 820, and the assistance device 830 may be any of a variety of forms of devices, e.g., a UE or a TRP, and the assistance devices 820, 830 may be different forms of devices. While one transmission assistance device is shown in FIG. 8, more than one transmission assistance device may be used.

The devices 810, 820, 830 may be examples of the device 500 with the interface 520 of the target device 810 and the assistance device 820 comprising at least a transmitter configured to transmit wireless signals from the devices 810, 820 and with the interface 520 of the assistance device 830 comprising at least a receiver configured to receive wireless signals at the assistance device 830 from the devices 810, 820. The target device 810 and the assistance device 820 may be configured to transmit RS signals in accordance with instructions from the RS transmission unit 550. For example, the RS transmission unit 550 may cause the interface 520 to transmit a DL-RS or a UL-RS, e.g., depending on a form of the target device 810 or the assistance device 820, respectively, and a form of the assistance device 830. For example, if the target device 810 and the assistance device 820 are TRPs and the assistance device 830 is a UE, then the RS transmission unit 550 of the target device 810 may cause the interface 520 to transmit DL-RS 811 and the RS transmission unit 550 of the assistance device 820 may cause the interface 520 to transmit DL-RS 812 as shown in FIG. 8, with the RS reception unit 560 of the assistance device 830 configured to receive and measure the DL-RS 811, 812. The target device 810 and the assistance device 820 may have a known timing relationship, e.g., being synchronized or having a known clock offset with respect to each other. The DL-RS 811, 812 may comprise PRS, SSB, DMRS, etc. The RS reception unit 560 of the assistance device 830 may be configured to measure respective received RS, e.g., to determine an RFFP for each of the devices 810, 820. The RFFP may comprise one or more signal measurements such as CIR, CFR, RSRQ, RSRP, delay spread, angle spread, AoA angle, and/or Doppler spread, etc., or any combinations captured at one or more antenna ports.

The devices 810, 820, 830 may be configured to provide information to the network entity 600, e.g., via wireless communication and/or wired communication directly and/or through one or more intermediaries, e.g., a TRP. The target device 810 may provide a location of the target device 810 and a calibrated Tx time delay of the target device 810 to the network entity 600, and the assistance device 820 may provide a location of the assistance device 820 and a calibrated Tx time delay of the assistance device 820 to the network entity 600. The target device 810 and/or the assistance device 820 may provide a confidence value and/or uncertainty range for the corresponding location. The target device 810 and/or the assistance device 820 may provide a confidence value and/or uncertainty range for the synchronization (or clock offset) for the devices 810, 820. The assistance device 820 may provide a confidence value and/or uncertainty range for the calibrated Tx time delay of the assistance device 820. The assistance device 820 may provide a confidence value and/or uncertainty range for the calibrated Tx time delay to the network entity 600.

The network entity 600 may implement an ML algorithm to determine a Tx time delay estimate 850 for the target device 810 based on inputs including a location 840 of the assistance device 830 (the measurement assistance device (Meas AD)) and one or more sets of inputs, e.g., inputs 841, 842, each corresponding to a respective transmitting device (either the target device 810 or another assistance device). The inputs 841 may include an RFFP constructed from a set of measurements obtained from the assistance device 830 corresponding to the DL-RS 811 sent by the target device 810 to the assistance device 830. The inputs 841 may also include the location of the target device 810 and may include a confidence level and/or uncertainty range of the location. The inputs 842 may include an RFFP constructed from a set of measurements obtained from the assistance device 830 corresponding to the DL-RS 812 sent by the assistance device 820 to the assistance device 830. The inputs 842 may include the location of the assistance device 820 and the calibrated Tx time delay corresponding to the assistance device 820. The inputs 842 may include the confidence level and/or the uncertainty range of the location of the assistance device 820 and/or the confidence level and/or the uncertainty range of the calibrated Tx time delay of the assistance device 820. The locations of the target device 810 and the assistance devices 820, 830 may be obtained using one or more known techniques (e.g., GNSS trilateration, terrestrial-based trilateration, E-CID, etc., and/or a combination of two or more techniques). The ML-based timing error estimation unit 650 may use the location 840 and the inputs 841, 842 (e.g., the RFFPs, the locations, the calibrated Tx time delay, and possibly one or more confidence values and/or uncertainty ranges) in an ML algorithm to determine and output the Tx time delay estimate 850 corresponding to the target device 810 as a calibrated Tx time delay. The use of more than one transmitting assistance device may improve the accuracy of the Tx time delay estimate determined for the target device 810.

Figure 9:
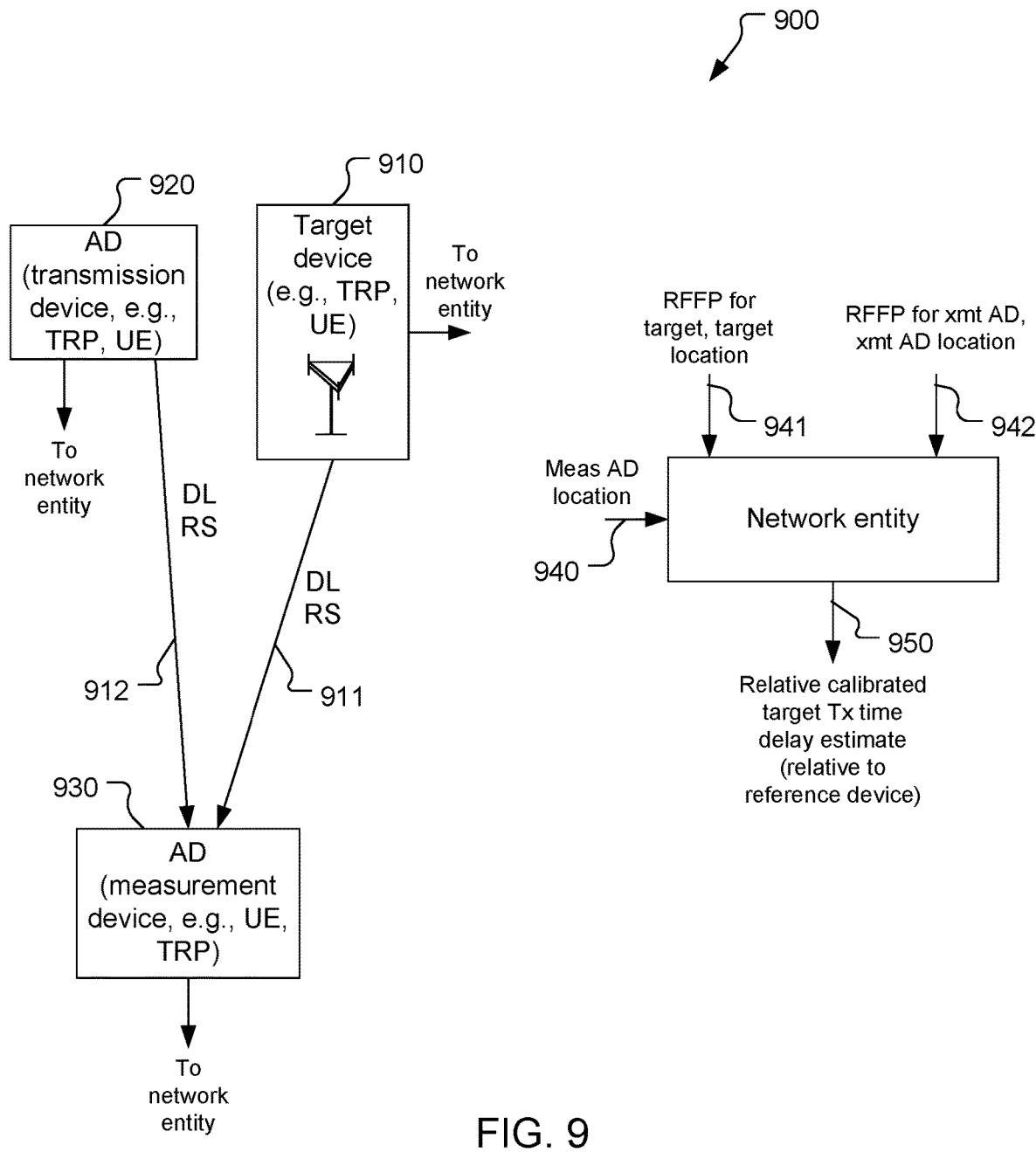
FIG. 9 is a block diagram of an environment for determining a relative Tx time delay of a target device.

Referring also to FIG. 9, an environment 900 for determining a relative Tx time delay of a target device relative to a reference device includes multiple wireless signal transfer devices, here a target device 910, an assistance device 920 that is a transmission device, an assistance device 930 that is a measurement device, and the network entity 600. The target device 910 may be configured and operate similarly to the target device 810. The target device 910 may be referred to as a reference device. The assistance device 920 may be a PRU, which may be an RSU (Roadside Unit). The assistance device 920 may be configured and operate similarly to the assistance device 820 although the assistance device 920 may not provide a calibrated Tx time delay of the assistance device 920 to the network entity 600. While one transmission assistance device is shown in FIG. 9, more than one transmission assistance device may be used. Also, while the relative Tx time delay relative to the reference device, e.g., the target device 910, may be determined without a calibrated Tx time delay of an assistance device provided, the use of one or more transmission assistance devices with known Tx time delay may be used and the known Tx time delay(s) may be provided to the network entity 600, which may improve performance (e.g., accuracy, tolerance to measurement errors/outliers) of the ML algorithm implemented by the network entity 600. Also or alternatively, while one measurement assistance device is shown in FIG. 9, multiple measurement assistance devices may be used, which may improve the accuracy of the relative Tx time delay estimation of the network entity 600.

The network entity 600 may implement an ML algorithm to determine a relative Tx time delay estimate 950 for assistance device 920 relative to the target device 910 based on inputs including a location 940 of the assistance device 930 (the measurement assistance device (Meas AD)) and sets of inputs, e.g., inputs 941, 942, each corresponding to a respective transmitting device (either the target device 910 or an assistance device other than the assistance device 930). The inputs 941 may include an RFFP constructed from a set of measurements obtained from the assistance device 930 corresponding to DL-RS 911 sent by the target device 910 to the assistance device 930. The inputs 941 may also include the location of the target device 910 and may include a confidence level and/or uncertainty range of the location. The inputs 942 may include an RFFP constructed from a set of measurements obtained from the assistance device 930 corresponding to DL-RS 912 sent by the assistance device 920 to the assistance device 930. The inputs 942 may include the location of the assistance device 920. The inputs 942 may include the confidence level and/or the uncertainty range of the location of the assistance device 920.

The locations of the target device 910 and the assistance devices 920, 930 may be obtained using one or more known techniques (e.g., GNSS trilateration, terrestrial-based trilateration, E-CID, etc., and/or a combination of two or more techniques). The ML-based timing error estimation unit 650 may use the location 940 and the inputs 941, 942 (e.g., the RFFPs, the locations, and possibly one or more confidence values and/or uncertainty ranges) and an indication of the reference device in an ML algorithm to determine and output the relative Tx time delay estimate 950 corresponding to the assistance device 920 relative to the target device 910 as a calibrated relative Tx time delay. For example, the network entity may determine a difference between times of arrival of the DL-RS 911 and the DL-RS 912 to determine the relative Tx time delay estimate 950 because $$TOA_1 - TOA_2 = \|Target - MeasAD\| + Tx_{target} - \|XmtAD - MeasAD\| - Tx_{XmtAD}$$

where $TOA_1$ is the time of arrival of a signal from the target device 910 at the assistance device 930 (the measurement assistance device), $TOA_2$ is the time of arrival of a signal from the assistance device 920 (the transmission assistance device) at the assistance device 930, $\|Target-MeasAD\|$ is the time of travel between the target device 910 and the assistance device 930, $Tx_{target}$ is the Tx time delay of the target device 910, $\|XmtAD-MeasAD\|$ is the time of travel between the assistance device 920 and the assistance device 930, and $Tx_{XmtAD}$ is the Tx time delay of the assistance device 920. The locations of the devices 910, 920, 930 are known and therefore the two transmit times can be computed, leaving only the difference between the Tx time delays, i.e., $Tx_{target} - Tx_{XmtAD}$, which is the relative Tx time delay of the assistance device 920 relative to the target device 910 (i.e., the reference device).

Absolute Tx time delays may help reduce the choices for a reference device. Absolute Tx time delays may be communicated to the assistance device 930 and/or to the network entity 600 and the assistance device 930 and/or the network entity 600 may choose the reference device and determine the relative delays. If absolute delays are known, then any devices may be selected for a relative time delay determination. If relative delays are known for multiple pairs of devices, then relative delays may be determined between any of these devices if the reference device for each relative delay is the same device. Absolute delays may help in estimating an Rx-Tx delay as the sum of the Rx time delay and the Tx time delay.

Figure 10:
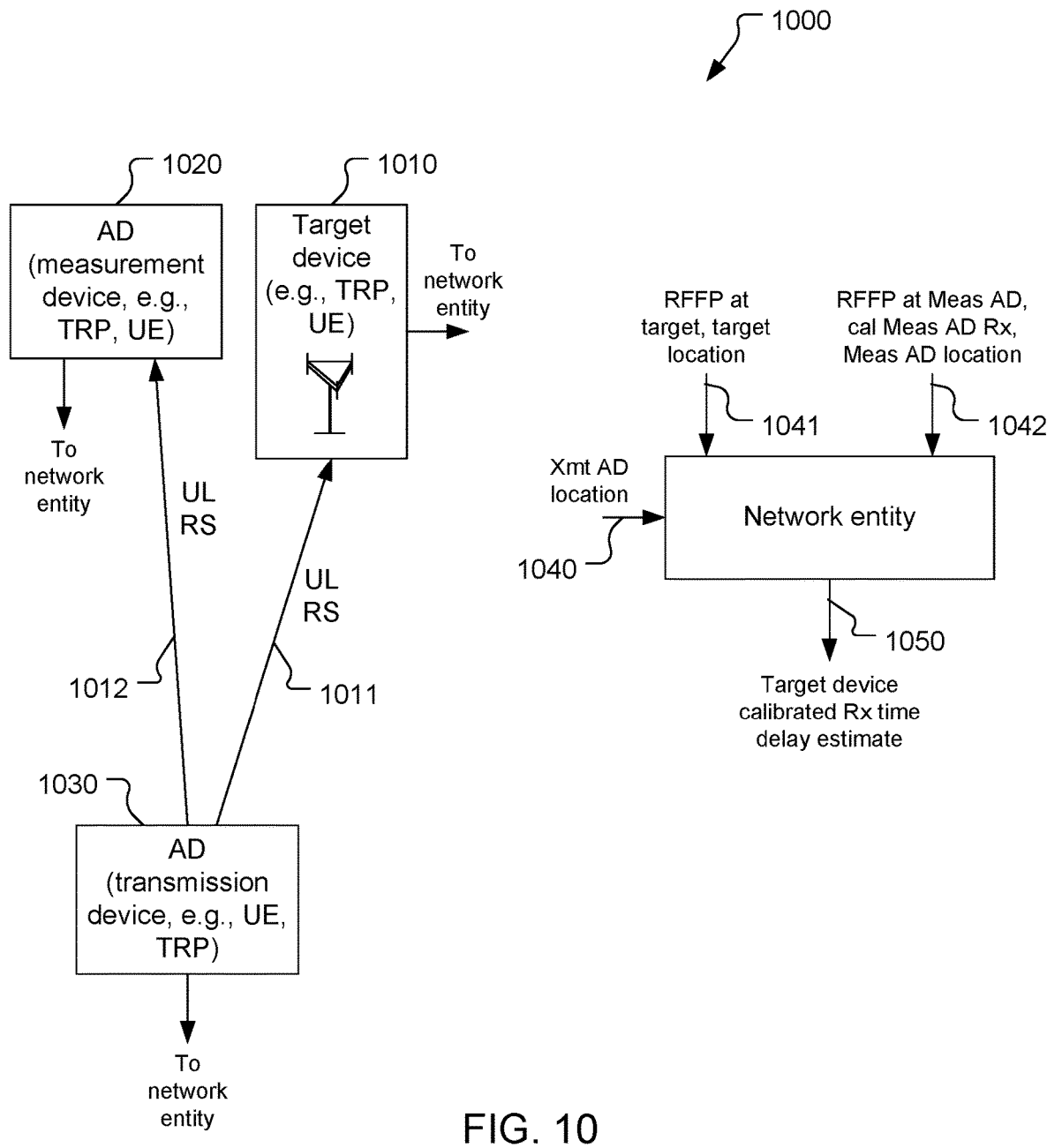
FIG. 10 is a block diagram of an environment for determining an Rx time delay of a target device.

Referring also to FIG. 10, an environment 1000 for determining an Rx time delay of a target device includes multiple wireless signal transfer devices, here a target device 1010, an assistance device 1020 that is a reception (measurement) device, an assistance device 1030 that is a transmission device, and the network entity 600. One or more of the assistance devices 1020, 1030 may each comprise a PRU. In this example, an ML-based Rx time delay estimation method may be run on the network entity 600 where an output of an ML model implemented by the network entity 600, e.g., the ML-based timing error estimation unit 650, is an Rx time delay estimate of the target device 1010. A procedure may be used to determine the Rx time delay estimate that parallels a UL-TDOA procedure with an Rx time delay (e.g., of a TRP) being unknown. The target device 1010, the assistance device 1020, and the assistance device 1030 may be any of a variety of forms of devices, e.g., a UE or a TRP, and the assistance devices 1020, 1030 may be different forms of devices. While one measurement assistance device is shown in FIG. 8, more than one measurement assistance device may be used.

The devices 1010, 1020, 1030 may be examples of the device 500 with the interface 520 of the target device 1010 and the assistance device 1020 comprising at least a receiver configured to receive wireless signals from the device 1030 and with the interface 520 of the assistance device 1030 comprising at least a transmitter configured to transmit wireless signals from the assistance device 1030 to the devices 1010, 1020. The target device 1010 and the assistance device 1020 may be configured to receive RS signals in accordance with instructions from the RS reception unit 560. For example, the RS reception unit 560 may cause the interface 520 to receive a DL-RS or a UL-RS, e.g., depending on a form of the target device 1010 or the assistance device 1020, respectively, and a form of the assistance device 1030. For example, if the target device 1010 and the assistance device 1020 are TRPs and the assistance device 1030 is a UE, then the RS reception unit 560 of the target device 810 may cause the interface 520 to receive UL-RS 1011 and the RS reception unit 560 of the assistance device 1020 may cause the interface 520 to receive UL-RS 1012 as shown in FIG. 10, with the RS transmission unit 550 of the assistance device 1030 configured to transmit the UL-RS 1011, 1012. The target device 1010 and the assistance device 1020 may have a known timing relationship, e.g., being synchronized or having a known clock offset with respect to each other. The UL-RS 1011, 1012 may comprise SRS, SRS-p, DMRS, etc. The RS reception unit 550 of the target device 1010 and the assistance device 1020 may be configured to measure respective received RS, e.g., to determine an RFFP at each of the devices 1010, 1020, respectively. The RFFP may comprise one or more signal measurements such as CIR, CFR, RSRQ, RSRP, delay spread, angle spread, AoA angle, and/or Doppler spread, etc., or any combinations captured at one or more antenna ports.

The devices 1010, 1020, 1030 may be configured to provide information to the network entity 600, e.g., via wireless communication and/or wired communication directly and/or through one or more intermediaries, e.g., a TRP. The target device 1010 may provide a location of the target device 1010 and an RFFP corresponding to the UL-RS 1011 to the network entity 600, and the assistance device 1020 may provide a location of the assistance device 1020, an RFP corresponding to the UL-RS 1012, and a calibrated Rx time delay of the assistance device 1020 to the network entity 600. The target device 1010 and/or the assistance device 1020 may provide a confidence value and/or uncertainty range for the corresponding location. The target device 1010 and/or the assistance device 1020 may provide a confidence value and/or uncertainty range for the synchronization (or clock offset) for the devices 1010, 1020. The assistance device 1020 may provide a confidence value and/or uncertainty range for the calibrated Rx time delay of the assistance device 1020. The assistance device 1020 may provide a confidence value and/or uncertainty range for the calibrated Rx time delay to the network entity 600.

The network entity 600 may implement an ML algorithm to determine an Rx time delay estimate 1050 for the target device 1010 based on inputs including a location 1040 of the assistance device 1030 (the measurement assistance device (Meas AD)) and one or more sets of inputs, e.g., inputs 1041, 1042, each corresponding to a respective reception/measurement device (either the target device 1010 or another assistance device).

The inputs 1041 may include an RFFP constructed from a set of measurements obtained from the target device 1010 corresponding to the UL-RS 1011 sent by the assistance device 1030 to the target device 1010. The inputs 841 may also include the location of the target device 1010 and may include a confidence level and/or uncertainty range of the location. The inputs 842 may include an RFFP constructed from a set of measurements obtained from the assistance device 1020 corresponding to the UL-RS 1012 sent by the assistance device 1030 to the assistance device 1020. The inputs 842 may include the location of the assistance device 1020 and the calibrated Rx time delay corresponding to the assistance device 1020. The inputs 842 may include the confidence level and/or the uncertainty range of the location of the assistance device 1020 and/or the confidence level and/or the uncertainty range of the calibrated Rx time delay of the assistance device 1020. The locations of the target device 1010 and the assistance devices 1020, 1030 may be obtained using one or more known techniques (e.g., GNSS trilateration, terrestrial-based trilateration, E-CID, etc., and/or a combination of two or more techniques). The ML-based timing error estimation unit 650 may use the location 1040 and the inputs 1041, 1042 (e.g., the RFFPs, the locations, the calibrated Rx time delay, and possibly one or more confidence values and/or uncertainty ranges) in an ML algorithm to determine and output the Rx time delay estimate 1050 corresponding to the target device 1010 as a calibrated Rx time delay. The use of more than one transmitting assistance device may improve the accuracy of the Rx time delay estimate determined for the target device 1010.

Figure 11:
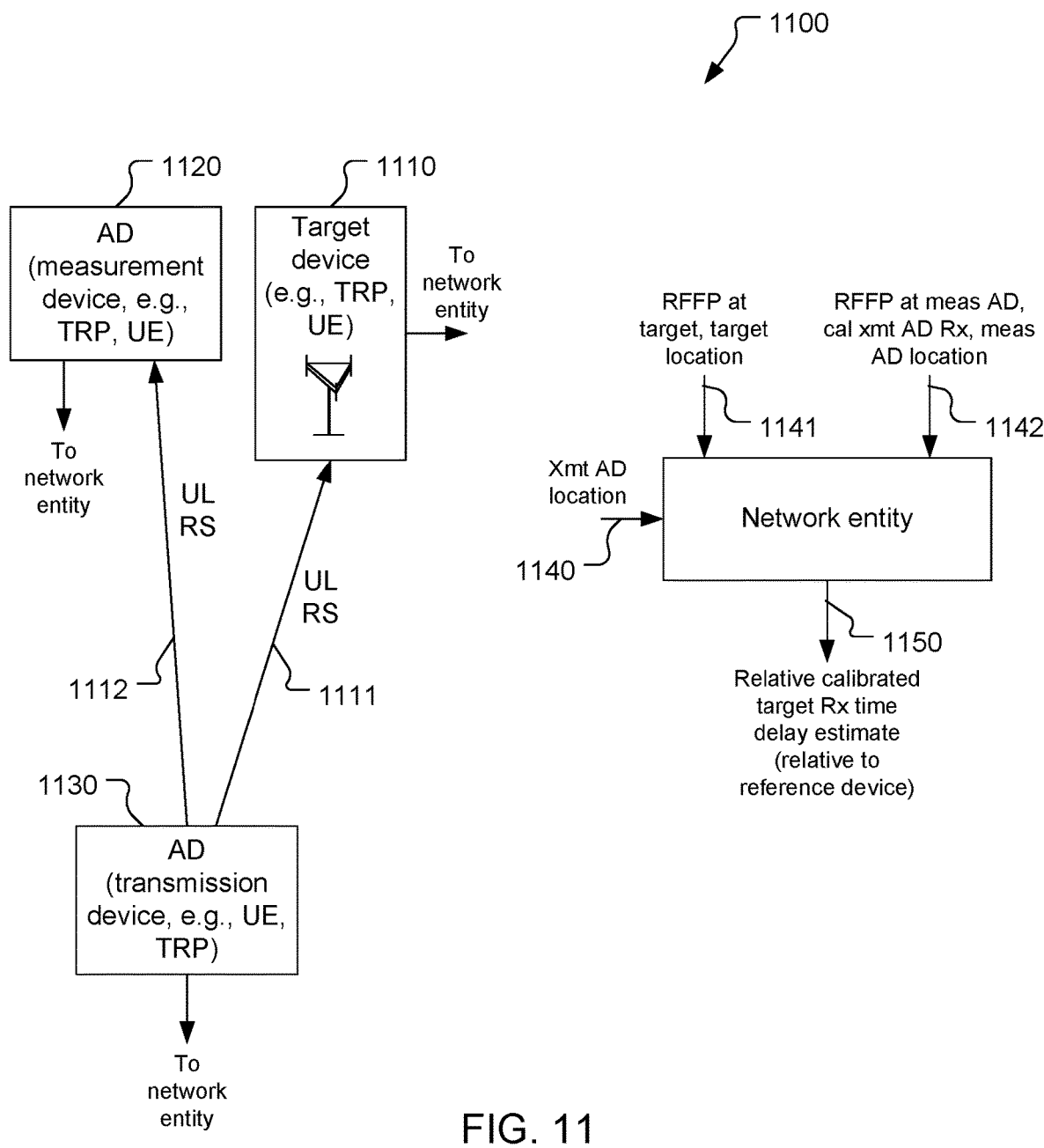
FIG. 11 is a block diagram of an environment for determining a relative Rx time delay of a target device.

Referring also to FIG. 11, an environment 1100 for determining a relative Rx time delay of a target device relative to a reference device includes multiple wireless signal transfer devices, here a target device 1110, an assistance device 1120 that is a reception device, an assistance device 1130 that is a transmission device, and the network entity 600. The target device 1110 may be configured and operate similarly to the target device 1010. The target device 1110 may be referred to as a reference device. The assistance device 1120 may be a PRU, which may be an RSU (Roadside Unit). The assistance device 1120 may be configured and operate similarly to the assistance device 1020 although the assistance device 1120 may not provide a calibrated Rx time delay of the assistance device 1120 to the network entity 600. While one reception assistance device is shown in FIG. 11, more than one reception assistance device may be used. Also, while the relative Rx time delay relative to the reference device, e.g., the target device 1110, may be determined without a calibrated Rx time delay of an assistance device provided, the use of one or more transmission assistance devices with known Rx time delay may be used and the known Rx time delay(s) may be provided to the network entity 600, which may improve performance of the ML algorithm implemented by the network entity 600. Also or alternatively, while one transmission assistance device is shown in FIG. 11, multiple transmission assistance devices may be used, which may improve the accuracy of the relative Rx time delay estimation of the network entity 600.

The network entity 600 may implement an ML algorithm to determine a relative Rx time delay estimate 1150 for assistance device 1120 relative to the target device 1110 based on inputs including a location 1140 of the assistance device 1130 (the transmission assistance device (Xmt AD)) and sets of inputs, e.g., inputs 1141, 1142, each corresponding to a respective reception device (either the target device 1110 or an assistance device other than the assistance device 1130). The inputs 1141 may include an RFFP constructed from a set of measurements obtained from the target device 1110 corresponding to UL-RS 1111 sent by the assistance device 1130 to the target device 1110. The inputs 1141 may also include the location of the target device 1110 and may include a confidence level and/or uncertainty range of the location. The inputs 1142 may include an RFFP constructed from a set of measurements obtained from the assistance device 1120 corresponding to UL-RS 1112 sent by the assistance device 9113020 to the assistance device 1120. The inputs 1142 may include the location of the assistance device 1120. The inputs 1142 may include the confidence level and/or the uncertainty range of the location of the assistance device 1120. The locations of the target device 1110 and the assistance devices 1120, 1130 may be obtained using one or more known techniques (e.g., GNSS trilateration, terrestrial-based trilateration, E-CID, etc., and/or a combination of two or more techniques). The ML-based timing error estimation unit 650 may use the location 1140 and the inputs 1141, 1142 (e.g., the RFFPs, the locations, and possibly one or more confidence values and/or uncertainty ranges) and an indication of the reference device in an ML algorithm to determine and output the relative Rx time delay estimate 1150 corresponding to the assistance device 1120 relative to the target device 1110 as a calibrated relative Rx time delay, e.g., based on time-of-arrival measurements and known travel times between the devices 1110, 1130 and between the devices 1120, 1130, similar to the discussion above with respect to relative Tx time delay estimation determination.

The techniques discussed herein may be applied per device panel/antenna/chain, e.g., per UE panel/antenna/signal processing chain and/or per TRP panel/antenna/signal processing chain. Implementation of the machine learning algorithm has been discussed as being performed by the network entity 600, but the algorithm may be implemented (e.g., training and/or estimation) at any appropriate device with sufficient processing capability, e.g., a TRP, a UE, a server (e.g., an LMF or a third-party server such as an OTT (Over-The-Top) server, etc.), etc. Labels for training the ML algorithm may be obtained using any of various devices such as TRPs or UEs with known timing delay errors. For example, a network may include multiple TRPs, some of which may have very accurate timing delay estimates. For other TRPs, techniques discussed herein may be applied to estimate relevant timing delay values. Similarly, for UEs, like PRUs, timing delays may be known with very high accuracy.

A server such as an LMF may initiate a session to estimate a signal time delay, e.g., an Rx-Tx time delay, a Tx time delay, an Rx time delay, a relative Tx time delay, and/or a relative Rx time delay for a UE and/or a TRP. The initiation may be done using LPP messages. Devices to participate in the time delay estimation may be selected, e.g., by the LMF, and configured accordingly depending on the parameter to be estimated. The RFFP measurements from devices may be provided to the LMF and the LMF may estimate an unknown time delay using the ML algorithm (ML model). The time delay estimate may be shared with one or more devices for which the time delay may be useful (e.g., for positioning), e.g., with a UE. The time delay estimate may be shared through a broadcast message, e.g., SIB (System Information Block), or through a dedicated message, e.g., LPP message. The time delay estimation may be used by a device in a future positioning session.

A UE may request that a server, e.g., an LMF, to configure and initiate a time delay estimation session. For example, a request may indicate which parameter (which time delay (e.g., Rx-Tx, Tx, Rx, relative Tx, relative Rx) is requested to be estimated, and may be communicated using an LPP message to the server. Based on the request, the server may configure the time delay estimation session including appropriate device selection (e.g., reference device selection, transmission device(s) selection, measurement device(s) selection), signal transmissions, and measurement reporting.

A base station (e.g., a gNB) may request a time delay estimation session for a TRP of the base station. Signaling/messaging through the NRPPa protocol may be used to facilitate the request.

Time delays may be used to calibrate signal measurement values for positioning. For example, in DL-TDOA, UL-TDOA, or RTT, absolute or relative time delays may be provided (e.g., from an LMF to a UE or gNB) and used to calibrate appropriate positioning measurement values, e.g., RSTD, RTOA. Calibrated values may be reported, e.g., from a UE and/or TRP to a network entity for network-based positioning sessions.

For UE-based positioning sessions, the UE may apply the calibrated time delay(s) to determine a position estimate for the UE.

Figure 12:
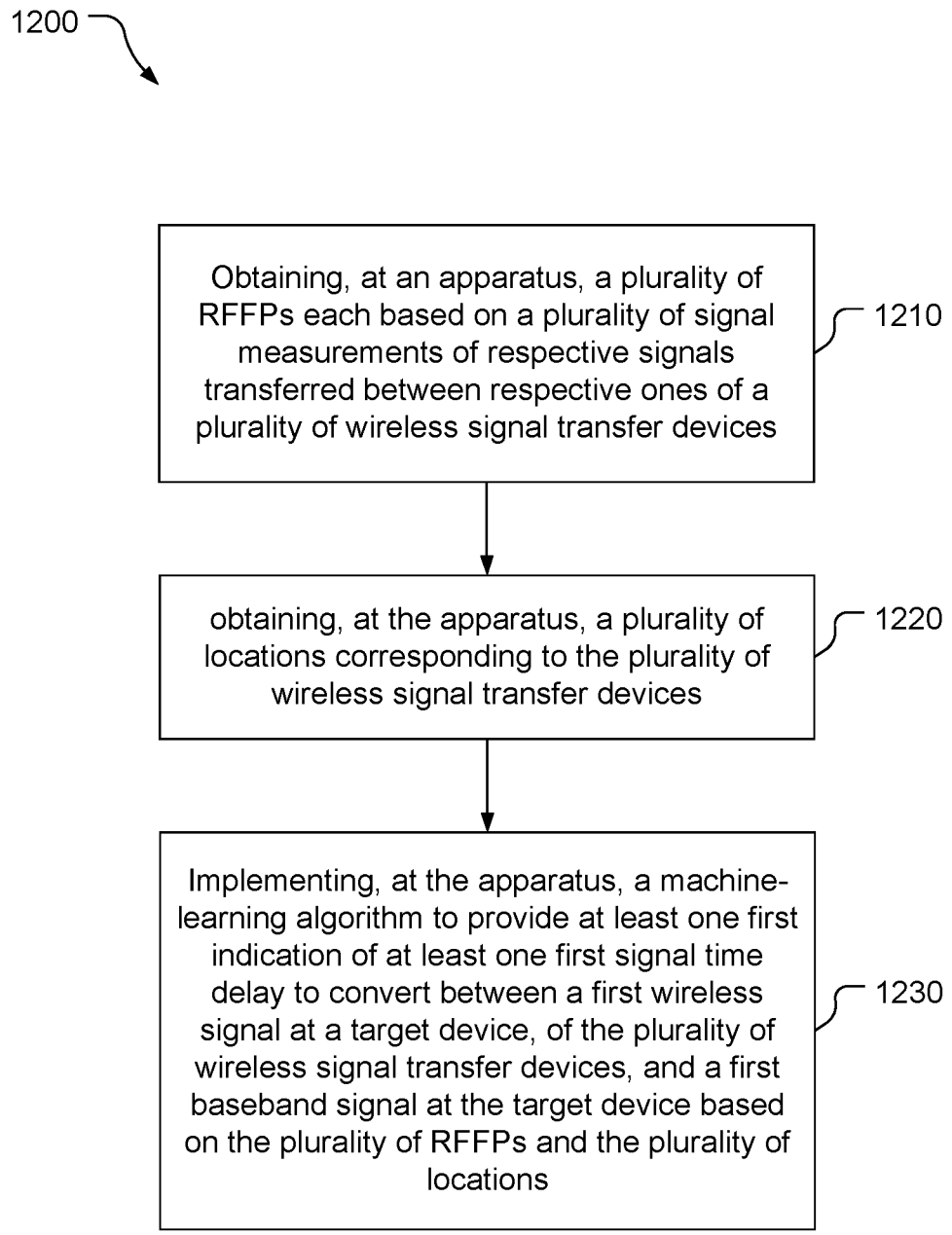
FIG. 12 is a block diagram of a signal time delay estimation method.

Referring to FIG. 12, with further reference to FIGS. 1-11, a signal time delay estimation method 1200 includes the stages shown. The method 1200 is, however, an example and not limiting. The method 1200 may be altered, e.g., by having one or more stages added, removed, rearranged, combined, performed concurrently, and/or having one or more single stages split into multiple stages.

At stage 1210, the method 1200 includes obtaining, at an apparatus, a plurality of RFFPs each based on a plurality of signal measurements of respective signals transferred between respective ones of a plurality of wireless signal transfer devices. The processor 610, possibly in combination with the memory 630, in combination with the receiver 620 may comprise means for obtaining the plurality of RFFPs. Also or alternatively, the processor 510, possibly in combination with the memory 530, in combination with the interface 520 may comprise means for obtaining the plurality of RFFPs.

At stage 1220, the method 1200 includes obtaining, at the apparatus, a plurality of locations corresponding to the plurality of wireless signal transfer devices. The processor 610, possibly in combination with the memory 630, in combination with the receiver 620 may comprise means for obtaining the plurality of locations. Also or alternatively, the processor 510, possibly in combination with the memory 530, in combination with the interface 520 may comprise means for obtaining the plurality of locations.

At stage 1230, the method 1200 includes implementing, at the apparatus, a machine-learning algorithm to provide at least one first indication of at least one first signal time delay to convert between a first wireless signal at a target device, of the plurality of wireless signal transfer devices, and a first baseband signal at the target device based on the plurality of RFFPs and the plurality of locations. The first signal time delay may be, e.g., a Rx-Tx time delay, a Tx time delay, a relative Tx time delay, an Rx time delay, or a relative Rx time delay. The processor 610, possibly in combination with the memory 630, may comprise means for implementing the ML algorithm. Also or alternatively, the processor 510, possibly in combination with the memory 530, may comprise means for implementing the ML algorithm.

Implementations of the method 1200 may include one or more of the following features. In an example implementation, the method includes obtaining, at the apparatus, one or more second indications of one or more one second signal time delays to convert respectively, at each of one or more assistance devices of the plurality of wireless signal transfer devices other than the target device, between a second wireless signal and a second baseband signal, wherein the machine-learning algorithm is implemented to provide the at least one first indication of the at least one first signal time delay based further on the one or more second indications of the one or more second signal time delays. The processor 610, possibly in combination with the memory 630, in combination with the receiver 620 may comprise means for obtaining the one or more second indications of one or more one second signal time delays. Also or alternatively, the processor 510, possibly in combination with the memory 530, in combination with the interface 520 may comprise means for obtaining the one or more second indications of one or more one second signal time delays. In a further example implementation: the plurality of RFFPs include: (1) one or more first RFFPs based on one or more first signal measurements of one or more first signals wirelessly transferred from the one or more assistance devices respectively to the target device; and (2) one or more second RFFPs based on one or more second signal measurements of one or more second signals wirelessly transferred from the target device to the one or more assistance devices respectively; the at least one first indication of the at least one first signal time delay indicates a first receive/transmit signal time delay of the target device; and each the one or more second indications of the one or more second signal time delays indicates a respective second receive/transmit signal time delay of each of a respective one of the one or more assistance devices. In a further example implementation, the method 1200 includes obtaining, at the apparatus, a third indication of an uncalibrated receive/transmit signal time delay of the target device or a partially-calibrated receive/transmit signal time delay of the target device, wherein the machine-learning algorithm is implemented to provide the at least one first indication of the at least one first signal time delay based further on the third indication. The processor 610, possibly in combination with the memory 630, in combination with the receiver 620 may comprise means for obtaining the third indication. Also or alternatively, the processor 510, possibly in combination with the memory 530, in combination with the interface 520 may comprise means for obtaining the third indication. In another further example implementation: the apparatus is a network entity; the one or more assistance devices comprise one or more user equipments; the target device comprises a transmission/reception point; each of the one or more second indications of the one or more second signal time delays indicates a respective calibrated receive/transmit signal time delay of a respective one of the one or more assistance devices; and the plurality of RFFPs comprise, for each combination of the target device and a respective one of the one or more assistance devices, a first RFFP based on a first plurality of measurements of a downlink signal from the target device to the respective assistance device and a second RFFP based on a second plurality of measurements of an uplink signal from the respective assistance device to the target device. In another further example implementation: the apparatus is a network entity; the one or more assistance devices comprise one or more transmission/reception points; the target device comprises a user equipment; each of the one or more second indications of the one or more second signal time delays indicates a respective calibrated receive/transmit signal time delay of a respective one of the one or more assistance devices; and the plurality of RFFPs comprise, for each combination of the target device and a respective one of the one or more assistance devices, a first RFFP based on a first plurality of measurements of an uplink signal from the target device to the respective assistance device and a second RFFP based on a second plurality of measurements of a downlink signal from the respective assistance device to the target device. In another further example implementation: the apparatus is a network entity; the plurality of wireless signal transfer devices comprise a user equipment; the target device comprises a first transmission/reception point; the one or more assistance devices comprise one or more second transmission/reception points, wherein each of the one or more second transmission/reception points has a respective known timing relationship with respect to the first transmission/reception point; each of the one or more second indications of the one or more second signal time delays indicates a respective calibrated transmit signal time delay of a respective one of the one or more assistance devices; the plurality of RFFPs comprise: a first RFFP based on a first plurality of measurements of a first downlink signal from the target device to the user equipment; and one or more second RFFPs each based on a respective second plurality of measurements of a respective second downlink signal from a respective one of the one or more assistance devices to the user equipment; and the at least one first indication of the at least one first signal time delay indicates a transmit signal time delay of the target device. The known timing relationship may be, e.g., time synchronization or known timing offset. In another further example implementation: the apparatus is a network entity; the plurality of wireless signal transfer devices comprise a transmission/reception point; the target device comprises a first user equipment; the one or more assistance devices comprise one or more second user equipments, wherein each of the one or more second user equipments has a respective known timing relationship with respect to the first user equipment; each of the one or more second indications of the one or more second signal time delays indicates a respective calibrated transmit signal time delay of a respective one of the one or more assistance devices; the plurality of RFFPs comprise: a first RFFP based on a first plurality of measurements of a first uplink signal from the target device to the transmission/reception point; and one or more second RFFPs each based on a respective second plurality of measurements of a respective second uplink signal from a respective one of the one or more assistance devices to the transmission/reception point; and the at least one first indication of the at least one first signal time delay indicates a transmit signal time delay of the target device. In another further example implementation: the apparatus is a network entity; the plurality of wireless signal transfer devices comprise a user equipment; the target device comprises a first transmission/reception point; the one or more assistance devices comprise one or more second transmission/reception points, wherein each of the one or more second transmission/reception points has a respective known timing relationship with respect to the first transmission/reception point; each of the one or more second indications of the one or more second signal time delays indicates a respective calibrated receive signal time delay of a respective one of the one or more assistance devices; the plurality of RFFPs comprise: a first RFFP based on a first plurality of measurements of a first uplink signal from the user equipment to the target device; and one or more second RFFPs each based on a respective second plurality of measurements of a respective second uplink signal from the user equipment to a respective one of the one or more assistance devices; and the at least one first indication of the at least one first signal time delay indicates a receive signal time delay of the target device. In another further example implementation: the apparatus is a network entity; the plurality of wireless signal transfer devices comprise a transmission/reception point; the target device comprises a first user equipment; the one or more assistance devices comprise one or more second user equipments, wherein each of the one or more second user equipments has a respective known timing relationship with respect to the first user equipment; each of the one or more second indications of the one or more second signal time delays indicates a respective calibrated receive signal time delay of a respective one of the one or more assistance devices; the plurality of RFFPs comprise: a first RFFP based on a first plurality of measurements of a first downlink signal from the transmission/reception point to the target device; and one or more second RFFPs each based on a respective second plurality of measurements of a respective second downlink signal from the transmission/reception point to a respective one of the one or more assistance devices; and the at least one first indication of the at least one first signal time delay indicates a receive signal time delay of the target device.

Also or alternatively, implementations of the method 1200 may include one or more of the following features. In an example implementation: the plurality of wireless signal transfer devices comprise a measurement device; the one or more assistance devices comprise a transmission device; the plurality of RFFPs comprise: a first RFFP based on a first plurality of measurements of a first signal from the target device to the measurement device; and a second RFFP based on a second plurality of measurements of a second signal from the transmission device to the measurement device; and the at least one first indication of the at least one first signal time delay indicates a relative transmit signal time delay of the target device relative to the transmission device. In another example implementation: the plurality of wireless signal transfer devices comprise a transmission device; the one or more assistance devices comprise a measurement device; the plurality of RFFPs comprise: a first RFFP based on a first plurality of measurements of a first signal from the transmission device to the target device; and a second RFFP based on a second plurality of measurements of a second signal from the transmission device to the measurement device; and the at least one first indication of the at least one first signal time delay indicates a relative transmit signal time delay of the target device relative to the transmission device.

IMPLEMENTATION EXAMPLES

Implementation examples are provided in the following numbered clauses.

Clause 1. An apparatus comprising:
a receiver;
a memory; and
a processor, communicatively coupled to the receiver and the memory, configured to:
 obtain a plurality of RFFPs (radio frequency fingerprints) each based on a plurality of signal measurements of respective signals transferred between respective ones of a plurality of wireless signal transfer devices;
 obtain a plurality of locations corresponding to the plurality of wireless signal transfer devices; and
 implement a machine-learning algorithm to provide at least one first indication of at least one first signal time delay to convert between a first wireless signal at a target device, of the plurality of wireless signal transfer devices, and a first baseband signal at the target device based on the plurality of RFFPs and the plurality of locations.

Clause 2. The apparatus of clause 1, wherein the processor is further configured to:
obtain one or more second indications of one or more one second signal time delays to convert respectively, at each of one or more assistance devices of the plurality of wireless signal transfer devices other than the target device, between a second wireless signal and a second baseband signal; and
implement the machine-learning algorithm to provide the at least one first indication of the at least one first signal time delay based further on the one or more second indications of the one or more second signal time delays.

Clause 3. The apparatus of clause 2, wherein:
the plurality of RFFPs include: (1) one or more first RFFPs based on one or more first signal measurements of one or more first signals wirelessly transferred from the one or more assistance devices respectively to the target device; and (2) one or more second RFFPs based on one or more second signal measurements of one or more second signals wirelessly transferred from the target device to the one or more assistance devices respectively;
the at least one first indication of the at least one first signal time delay indicates a first receive/transmit signal time delay of the target device; and
each the one or more second indications of the one or more second signal time delays indicates a respective second receive/transmit signal time delay of each of a respective one of the one or more assistance devices.

Clause 4. The apparatus of clause 3, wherein the processor is further configured to:
obtain a third indication of an uncalibrated receive/transmit signal time delay of the target device or a partially-calibrated receive/transmit signal time delay of the target device; and
implement the machine-learning algorithm to provide the at least one first indication of the at least one first signal time delay based further on the third indication.

Clause 5. The apparatus of clause 2, wherein:
the apparatus is a network entity;
the one or more assistance devices comprise one or more user equipments;
the target device comprises a transmission/reception point;
each of the one or more second indications of the one or more second signal time delays indicates a respective calibrated receive/transmit signal time delay of a respective one of the one or more assistance devices; and
the plurality of RFFPs comprise, for each combination of the target device and a respective one of the one or more assistance devices, a first RFFP based on a first plurality of measurements of a downlink signal from the target device to the respective assistance device and a second RFFP based on a second plurality of measurements of an uplink signal from the respective assistance device to the target device.

Clause 6. The apparatus of clause 2, wherein:
the apparatus is a network entity;
the one or more assistance devices comprise one or more transmission/reception points;
the target device comprises a user equipment;
each of the one or more second indications of the one or more second signal time delays indicates a respective calibrated receive/transmit signal time delay of a respective one of the one or more assistance devices; and
the plurality of RFFPs comprise, for each combination of the target device and a respective one of the one or more assistance devices, a first RFFP based on a first plurality of measurements of an uplink signal from the target device to the respective assistance device and a second RFFP based on a second plurality of measurements of a downlink signal from the respective assistance device to the target device.

7. The apparatus of clause 2, wherein:
the apparatus is a network entity;
the plurality of wireless signal transfer devices comprise a user equipment;
the target device comprises a first transmission/reception point;
the one or more assistance devices comprise one or more second transmission/reception points, wherein each of the one or more second transmission/reception points has a respective known timing relationship with respect to the first transmission/reception point;
each of the one or more second indications of the one or more second signal time delays indicates a respective calibrated transmit signal time delay of a respective one of the one or more assistance devices;
the plurality of RFFPs comprise:
a first RFFP based on a first plurality of measurements of a first downlink signal from the target device to the user equipment; and
one or more second RFFPs each based on a respective second plurality of measurements of a respective second downlink signal from a respective one of the one or more assistance devices to the user equipment; and
the at least one first indication of the at least one first signal time delay indicates a transmit signal time delay of the target device.

Clause 8. The apparatus of clause 2, wherein:
the apparatus is a network entity;
the plurality of wireless signal transfer devices comprise a transmission/reception point;
the target device comprises a first user equipment;
the one or more assistance devices comprise one or more second user equipments, wherein each of the one or more second user equipments has a respective known timing relationship with respect to the first user equipment;
each of the one or more second indications of the one or more second signal time delays indicates a respective calibrated transmit signal time delay of a respective one of the one or more assistance devices;
the plurality of RFFPs comprise:
a first RFFP based on a first plurality of measurements of a first uplink signal from the target device to the transmission/reception point; and
one or more second RFFPs each based on a respective second plurality of measurements of a respective second uplink signal from a respective one of the one or more assistance devices to the transmission/reception point; and
the at least one first indication of the at least one first signal time delay indicates a transmit signal time delay of the target device.

Clause 9. The apparatus of clause 2, wherein:
the apparatus is a network entity;
the plurality of wireless signal transfer devices comprise a user equipment;
the target device comprises a first transmission/reception point;
the one or more assistance devices comprise one or more second transmission/reception points, wherein each of the one or more second transmission/reception points has a respective known timing relationship with respect to the first transmission/reception point;
each of the one or more second indications of the one or more second signal time delays indicates a respective calibrated receive signal time delay of a respective one of the one or more assistance devices;
the plurality of RFFPs comprise:
a first RFFP based on a first plurality of measurements of a first uplink signal from the user equipment to the target device; and
one or more second RFFPs each based on a respective second plurality of measurements of a respective second uplink signal from the user equipment to a respective one of the one or more assistance devices; and
the at least one first indication of the at least one first signal time delay indicates a receive signal time delay of the target device.

10. The apparatus of clause 2, wherein:
the apparatus is a network entity;
the plurality of wireless signal transfer devices comprise a transmission/reception point;
the target device comprises a first user equipment;
the one or more assistance devices comprise one or more second user equipments, wherein each of the one or more second user equipments has a respective known timing relationship with respect to the first user equipment;

each of the one or more second indications of the one or more second signal time delays indicates a respective calibrated receive signal time delay of a respective one of the one or more assistance devices;

the plurality of RFFPs comprise:
  a first RFFP based on a first plurality of measurements of a first downlink signal from the transmission/reception point to the target device; and
  one or more second RFFPs each based on a respective second plurality of measurements of a respective second downlink signal from the transmission/reception point to a respective one of the one or more assistance devices; and
  the at least one first indication of the at least one first signal time delay indicates a receive signal time delay of the target device.

Clause 11. The apparatus of clause 1, wherein:
the plurality of wireless signal transfer devices comprise a measurement device;
the one or more assistance devices comprise a transmission device;
the plurality of RFFPs comprise:
  a first RFFP based on a first plurality of measurements of a first signal from the target device to the measurement device; and
  a second RFFP based on a second plurality of measurements of a second signal from the transmission device to the measurement device; and
  the at least one first indication of the at least one first signal time delay indicates a relative transmit signal time delay of the target device relative to the transmission device.

Clause 12. The apparatus of clause 1, wherein:
the plurality of wireless signal transfer devices comprise a transmission device;
the one or more assistance devices comprise a measurement device;
the plurality of RFFPs comprise:
  a first RFFP based on a first plurality of measurements of a first signal from the transmission device to the target device; and
  a second RFFP based on a second plurality of measurements of a second signal from the transmission device to the measurement device; and
  the at least one first indication of the at least one first signal time delay indicates a relative transmit signal time delay of the target device relative to the transmission device.

Clause 13. A signal time delay estimation method comprising:
  obtaining, at an apparatus, a plurality of RFFPs (radio frequency fingerprints) each based on a plurality of signal measurements of respective signals transferred between respective ones of a plurality of wireless signal transfer devices;
  obtaining, at the apparatus, a plurality of locations corresponding to the plurality of wireless signal transfer devices; and
  implementing, at the apparatus, a machine-learning algorithm to provide at least one first indication of at least one first signal time delay to convert between a first wireless signal at a target device, of the plurality of wireless signal transfer devices, and a first baseband signal at the target device based on the plurality of RFFPs and the plurality of locations.

Clause 14. The signal time delay estimation method of clause 13, further comprising obtaining, at the apparatus, one or more second indications of one or more one second signal time delays to convert respectively, at each of one or more assistance devices of the plurality of wireless signal transfer devices other than the target device, between a second wireless signal and a second baseband signal, wherein the machine-learning algorithm is implemented to provide the at least one first indication of the at least one first signal time delay based further on the one or more second indications of the one or more second signal time delays.

Clause 15. The signal time delay estimation method of clause 14, wherein:
  the plurality of RFFPs include: (1) one or more first RFFPs based on one or more first signal measurements of one or more first signals wirelessly transferred from the one or more assistance devices respectively to the target device; and (2) one or more second RFFPs based on one or more second signal measurements of one or more second signals wirelessly transferred from the target device to the one or more assistance devices respectively;
  the at least one first indication of the at least one first signal time delay indicates a first receive/transmit signal time delay of the target device; and
  each the one or more second indications of the one or more second signal time delays indicates a respective second receive/transmit signal time delay of each of a respective one of the one or more assistance devices.

Clause 16. The signal time delay estimation method of clause 15, further comprising obtaining, at the apparatus, a third indication of an uncalibrated receive/transmit signal time delay of the target device or a partially-calibrated receive/transmit signal time delay of the target device, wherein the machine-learning algorithm is implemented to provide the at least one first indication of the at least one first signal time delay based further on the third indication.

Clause 17. The signal time delay estimation method of clause 14, wherein:
  the apparatus is a network entity;
  the one or more assistance devices comprise one or more user equipments;
  the target device comprises a transmission/reception point;
  each of the one or more second indications of the one or more second signal time delays indicates a respective calibrated receive/transmit signal time delay of a respective one of the one or more assistance devices; and
  the plurality of RFFPs comprise, for each combination of the target device and a respective one of the one or more assistance devices, a first RFFP based on a first plurality of measurements of a downlink signal from the target device to the respective assistance device and a second RFFP based on a second plurality of measurements of an uplink signal from the respective assistance device to the target device.

Clause 18. The signal time delay estimation method of clause 14, wherein:
  the apparatus is a network entity;
  the one or more assistance devices comprise one or more transmission/reception points;
  the target device comprises a user equipment;
  each of the one or more second indications of the one or more second signal time delays indicates a respective calibrated receive/transmit signal time delay of a respective one of the one or more assistance devices; and the plurality of RFFPs comprise, for each combination of the target device and a respective one of the one or more assistance devices, a first RFFP based on a first plurality of measurements of an uplink signal from the target device to the respective assistance device and a second RFFP based on a second plurality of measurements of a downlink signal from the respective assistance device to the target device.

Clause 19. The signal time delay estimation method of clause 14, wherein:
the apparatus is a network entity;
the plurality of wireless signal transfer devices comprise a user equipment;
the target device comprises a first transmission/reception point;
the one or more assistance devices comprise one or more second transmission/reception points, wherein each of the one or more second transmission/reception points has a respective known timing relationship with respect to the first transmission/reception point;
each of the one or more second indications of the one or more second signal time delays indicates a respective calibrated transmit signal time delay of a respective one of the one or more assistance devices;
the plurality of RFFPs comprise:
 a first RFFP based on a first plurality of measurements of a first downlink signal from the target device to the user equipment; and
 one or more second RFFPs each based on a respective second plurality of measurements of a respective second downlink signal from a respective one of the one or more assistance devices to the user equipment; and
the at least one first indication of the at least one first signal time delay indicates a transmit signal time delay of the target device.

Clause 20. The signal time delay estimation method of clause 14, wherein:
the apparatus is a network entity;
the plurality of wireless signal transfer devices comprise a transmission/reception point;
the target device comprises a first user equipment;
the one or more assistance devices comprise one or more second user equipments, wherein each of the one or more second user equipments has a respective known timing relationship with respect to the first user equipment;
each of the one or more second indications of the one or more second signal time delays indicates a respective calibrated transmit signal time delay of a respective one of the one or more assistance devices;
the plurality of RFFPs comprise:
 a first RFFP based on a first plurality of measurements of a first uplink signal from the target device to the transmission/reception point; and
 one or more second RFFPs each based on a respective second plurality of measurements of a respective second uplink signal from a respective one of the one or more assistance devices to the transmission/reception point; and
the at least one first indication of the at least one first signal time delay indicates a transmit signal time delay of the target device.

Clause 21. The signal time delay estimation method of clause 14, wherein:
the apparatus is a network entity;
the plurality of wireless signal transfer devices comprise a user equipment;
the target device comprises a first transmission/reception point;
the one or more assistance devices comprise one or more second transmission/reception points, wherein each of the one or more second transmission/reception points has a respective known timing relationship with respect to the first transmission/reception point;
each of the one or more second indications of the one or more second signal time delays indicates a respective calibrated receive signal time delay of a respective one of the one or more assistance devices;
the plurality of RFFPs comprise:
 a first RFFP based on a first plurality of measurements of a first uplink signal from the user equipment to the target device; and
 one or more second RFFPs each based on a respective second plurality of measurements of a respective second uplink signal from the user equipment to a respective one of the one or more assistance devices; and
the at least one first indication of the at least one first signal time delay indicates a receive signal time delay of the target device.

Clause 22. The signal time delay estimation method of clause 14, wherein:
the apparatus is a network entity;
the plurality of wireless signal transfer devices comprise a transmission/reception point;
the target device comprises a first user equipment;
the one or more assistance devices comprise one or more second user equipments, wherein each of the one or more second user equipments has a respective known timing relationship with respect to the first user equipment;
each of the one or more second indications of the one or more second signal time delays indicates a respective calibrated receive signal time delay of a respective one of the one or more assistance devices;
the plurality of RFFPs comprise:
 a first RFFP based on a first plurality of measurements of a first downlink signal from the transmission/reception point to the target device; and
 one or more second RFFPs each based on a respective second plurality of measurements of a respective second downlink signal from the transmission/reception point to a respective one of the one or more assistance devices; and
the at least one first indication of the at least one first signal time delay indicates a receive signal time delay of the target device.

Clause 23. The signal time delay estimation method of clause 13, wherein:
the plurality of wireless signal transfer devices comprise a measurement device;
the one or more assistance devices comprise a transmission device;
the plurality of RFFPs comprise:
a first RFFP based on a first plurality of measurements of a first signal from the target device to the measurement device; and a second RFFP based on a second plurality of measurements of a second signal from the transmission device to the measurement device; and the at least one first indication of the at least one first signal time delay indicates a relative transmit signal time delay of the target device relative to the transmission device.

Clause 24. The signal time delay estimation method of clause 13, wherein:

the plurality of wireless signal transfer devices comprise a transmission device;

the one or more assistance devices comprise a measurement device;

the plurality of RFFPs comprise:

a first RFFP based on a first plurality of measurements of a first signal from the transmission device to the target device; and a second RFFP based on a second plurality of measurements of a second signal from the transmission device to the measurement device; and the at least one first indication of the at least one first signal time delay indicates a relative transmit signal time delay of the target device relative to the transmission device.

Clause 25. An apparatus comprising:

means for obtaining a plurality of RFFPs (radio frequency fingerprints) each based on a plurality of signal measurements of respective signals transferred between respective ones of a plurality of wireless signal transfer devices;

means for obtaining a plurality of locations corresponding to the plurality of wireless signal transfer devices; and means for implementing a machine-learning algorithm to provide at least one first indication of at least one first signal time delay to convert between a first wireless signal at a target device, of the plurality of wireless signal transfer devices, and a first baseband signal at the target device based on the plurality of RFFPs and the plurality of locations.

Clause 26. The apparatus of clause 25, further comprising means for obtaining one or more second indications of one or more one second signal time delays to convert respectively, at each of one or more assistance devices of the plurality of wireless signal transfer devices other than the target device, between a second wireless signal and a second baseband signal, wherein the means for implementing the machine-learning algorithm comprise means for implementing the machine-learning algorithm to provide the at least one first indication of the at least one first signal time delay based further on the one or more second indications of the one or more second signal time delays.

Clause 27. The apparatus of clause 26, wherein:

the plurality of RFFPs include: (1) one or more first RFFPs based on one or more first signal measurements of one or more first signals wirelessly transferred from the one or more assistance devices respectively to the target device; and (2) one or more second RFFPs based on one or more second signal measurements of one or more second signals wirelessly transferred from the target device to the one or more assistance devices respectively;

the at least one first indication of the at least one first signal time delay indicates a first receive/transmit signal time delay of the target device; and each the one or more second indications of the one or more second signal time delays indicates a respective second receive/transmit signal time delay of each of a respective one of the one or more assistance devices.

Clause 28. The apparatus of clause 27, further comprising means for obtaining a third indication of an uncalibrated receive/transmit signal time delay of the target device or a partially-calibrated receive/transmit signal time delay of the target device, wherein the means for implementing the machine-learning algorithm comprise means for implementing the machine-learning algorithm to provide the at least one first indication of the at least one first signal time delay based further on the third indication.

Clause 29. The apparatus of clause 26, wherein:

the apparatus is a network entity;

the one or more assistance devices comprise one or more user equipments;

the target device comprises a transmission/reception point;

each of the one or more second indications of the one or more second signal time delays indicates a respective calibrated receive/transmit signal time delay of a respective one of the one or more assistance devices; and the plurality of RFFPs comprise, for each combination of the target device and a respective one of the one or more assistance devices, a first RFFP based on a first plurality of measurements of a downlink signal from the target device to the respective assistance device and a second RFFP based on a second plurality of measurements of an uplink signal from the respective assistance device to the target device.

Clause 30. The apparatus of clause 26, wherein:

the apparatus is a network entity;

the one or more assistance devices comprise one or more transmission/reception points;

the target device comprises a user equipment;

each of the one or more second indications of the one or more second signal time delays indicates a respective calibrated receive/transmit signal time delay of a respective one of the one or more assistance devices; and the plurality of RFFPs comprise, for each combination of the target device and a respective one of the one or more assistance devices, a first RFFP based on a first plurality of measurements of an uplink signal from the target device to the respective assistance device and a second RFFP based on a second plurality of measurements of a downlink signal from the respective assistance device to the target device.

Clause 31. The apparatus of clause 26, wherein:

the apparatus is a network entity;

the plurality of wireless signal transfer devices comprise a user equipment;

the target device comprises a first transmission/reception point;

the one or more assistance devices comprise one or more second transmission/reception points, wherein each of the one or more second transmission/reception points has a respective known timing relationship with respect to the first transmission/reception point;

each of the one or more second indications of the one or more second signal time delays indicates a respective calibrated transmit signal time delay of a respective one of the one or more assistance devices;

the plurality of RFFPs comprise:

a first RFFP based on a first plurality of measurements of a first downlink signal from the target device to the user equipment; and one or more second RFFPs each based on a respective second plurality of measurements of a respective second downlink signal from a respective one of the one or more assistance devices to the user equipment; and the at least one first indication of the at least one first signal time delay indicates a transmit signal time delay of the target device.

Clause 32. The apparatus of clause 26, wherein:
the apparatus is a network entity;
the plurality of wireless signal transfer devices comprise a transmission/reception point;
the target device comprises a first user equipment;
the one or more assistance devices comprise one or more second user equipments, wherein each of the one or more second user equipments has a respective known timing relationship with respect to the first user equipment;
each of the one or more second indications of the one or more second signal time delays indicates a respective calibrated transmit signal time delay of a respective one of the one or more assistance devices;
the plurality of RFFPs comprise:
  a first RFFP based on a first plurality of measurements of a first uplink signal from the target device to the transmission/reception point; and
  one or more second RFFPs each based on a respective second plurality of measurements of a respective second uplink signal from a respective one of the one or more assistance devices to the transmission/reception point; and
the at least one first indication of the at least one first signal time delay indicates a transmit signal time delay of the target device.

Clause 33. The apparatus of clause 26, wherein:
the apparatus is a network entity;
the plurality of wireless signal transfer devices comprise a user equipment;
the target device comprises a first transmission/reception point;
the one or more assistance devices comprise one or more second transmission/reception points, wherein each of the one or more second transmission/reception points has a respective known timing relationship with respect to the first transmission/reception point;
each of the one or more second indications of the one or more second signal time delays indicates a respective calibrated receive signal time delay of a respective one of the one or more assistance devices;
the plurality of RFFPs comprise:
  a first RFFP based on a first plurality of measurements of a first uplink signal from the user equipment to the target device; and
  one or more second RFFPs each based on a respective second plurality of measurements of a respective second uplink signal from the user equipment to a respective one of the one or more assistance devices; and
the at least one first indication of the at least one first signal time delay indicates a receive signal time delay of the target device.

Clause 34. The apparatus of clause 26, wherein:
the apparatus is a network entity;
the plurality of wireless signal transfer devices comprise a transmission/reception point;
the target device comprises a first user equipment;
the one or more assistance devices comprise one or more second user equipments, wherein each of the one or more second user equipments has a respective known timing relationship with respect to the first user equipment;
each of the one or more second indications of the one or more second signal time delays indicates a respective calibrated receive signal time delay of a respective one of the one or more assistance devices;
the plurality of RFFPs comprise:
  a first RFFP based on a first plurality of measurements of a first downlink signal from the transmission/reception point to the target device; and
  one or more second RFFPs each based on a respective second plurality of measurements of a respective second downlink signal from the transmission/reception point to a respective one of the one or more assistance devices; and
the at least one first indication of the at least one first signal time delay indicates a receive signal time delay of the target device.

Clause 35. The apparatus of clause 25, wherein:
the plurality of wireless signal transfer devices comprise a measurement device;
the one or more assistance devices comprise a transmission device;
the plurality of RFFPs comprise:
  a first RFFP based on a first plurality of measurements of a first signal from the target device to the measurement device; and
  a second RFFP based on a second plurality of measurements of a second signal from the transmission device to the measurement device; and
the at least one first indication of the at least one first signal time delay indicates a relative transmit signal time delay of the target device relative to the transmission device.

Clause 36. The apparatus of clause 25, wherein:
the plurality of wireless signal transfer devices comprise a transmission device;
the one or more assistance devices comprise a measurement device;
the plurality of RFFPs comprise:
  a first RFFP based on a first plurality of measurements of a first signal from the transmission device to the target device; and
  a second RFFP based on a second plurality of measurements of a second signal from the transmission device to the measurement device; and
the at least one first indication of the at least one first signal time delay indicates a relative transmit signal time delay of the target device relative to the transmission device.

Clause 37. A non-transitory, processor-readable storage medium comprising processor-readable instructions to cause a processor of an apparatus to:
  obtain a plurality of RFFPs (radio frequency fingerprints) each based on a plurality of signal measurements of respective signals transferred between respective ones of a plurality of wireless signal transfer devices;
  obtain a plurality of locations corresponding to the plurality of wireless signal transfer devices; and
  implement a machine-learning algorithm to provide at least one first indication of at least one first signal time delay to convert between a first wireless signal at a target device, of the plurality of wireless signal transfer devices, and a first baseband signal at the target device based on the plurality of RFFPs and the plurality of locations.

Clause 38. The non-transitory, processor-readable storage medium of clause 37, further comprising processor-readable instructions to cause the processor to obtain one or more second indications of one or more one second signal time delays to convert respectively, at each of one or more assistance devices of the plurality of wireless signal transfer devices other than the target device, between a second wireless signal and a second baseband signal, wherein the processor-readable instructions to cause the processor to implement the machine-learning algorithm comprise processor-readable instructions to cause the processor to implement the machine-learning algorithm to provide the at least one first indication of the at least one first signal time delay based further on the one or more second indications of the one or more second signal time delays.

Clause 39. The non-transitory, processor-readable storage medium of clause 38, wherein:
the plurality of RFFPs include: (1) one or more first RFFPs based on one or more first signal measurements of one or more first signals wirelessly transferred from the one or more assistance devices respectively to the target device; and (2) one or more second RFFPs based on one or more second signal measurements of one or more second signals wirelessly transferred from the target device to the one or more assistance devices respectively;
the at least one first indication of the at least one first signal time delay indicates a first receive/transmit signal time delay of the target device; and
each the one or more second indications of the one or more second signal time delays indicates a respective second receive/transmit signal time delay of each of a respective one of the one or more assistance devices.

Clause 40. The non-transitory, processor-readable storage medium of clause 39, further comprising processor-readable instructions to cause the processor to obtain a third indication of an uncalibrated receive/transmit signal time delay of the target device or a partially-calibrated receive/transmit signal time delay of the target device, wherein the processor-readable instructions to cause the processor to implement the machine-learning algorithm comprise processor-readable instructions to cause the processor to implement the machine-learning algorithm to provide the at least one first indication of the at least one first signal time delay based further on the third indication.

Clause 41. The non-transitory, processor-readable storage medium of clause 38, wherein:
the apparatus is a network entity;
the one or more assistance devices comprise one or more user equipments;
the target device comprises a transmission/reception point;
each of the one or more second indications of the one or more second signal time delays indicates a respective calibrated receive/transmit signal time delay of a respective one of the one or more assistance devices; and
the plurality of RFFPs comprise, for each combination of the target device and a respective one of the one or more assistance devices, a first RFFP based on a first plurality of measurements of a downlink signal from the target device to the respective assistance device and a second RFFP based on a second plurality of measurements of an uplink signal from the respective assistance device to the target device.

Clause 42. The non-transitory, processor-readable storage medium of clause 38, wherein:
the apparatus is a network entity;
the one or more assistance devices comprise one or more transmission/reception points;
the target device comprises a user equipment;
each of the one or more second indications of the one or more second signal time delays indicates a respective calibrated receive/transmit signal time delay of a respective one of the one or more assistance devices; and
the plurality of RFFPs comprise, for each combination of the target device and a respective one of the one or more assistance devices, a first RFFP based on a first plurality of measurements of an uplink signal from the target device to the respective assistance device and a second RFFP based on a second plurality of measurements of a downlink signal from the respective assistance device to the target device.

Clause 43. The non-transitory, processor-readable storage medium of clause 38, wherein:
the apparatus is a network entity;
the plurality of wireless signal transfer devices comprise a user equipment;
the target device comprises a first transmission/reception point;
the one or more assistance devices comprise one or more second transmission/reception points, wherein each of the one or more second transmission/reception points has a respective known timing relationship with respect to the first transmission/reception point;
each of the one or more second indications of the one or more second signal time delays indicates a respective calibrated transmit signal time delay of a respective one of the one or more assistance devices;
the plurality of RFFPs comprise:
a first RFFP based on a first plurality of measurements of a first downlink signal from the target device to the user equipment; and
one or more second RFFPs each based on a respective second plurality of measurements of a respective second downlink signal from a respective one of the one or more assistance devices to the user equipment; and
the at least one first indication of the at least one first signal time delay indicates a transmit signal time delay of the target device.

Clause 44. The non-transitory, processor-readable storage medium of clause 38, wherein:
the apparatus is a network entity;
the plurality of wireless signal transfer devices comprise a transmission/reception point;
the target device comprises a first user equipment;
the one or more assistance devices comprise one or more second user equipments, wherein each of the one or more second user equipments has a respective known timing relationship with respect to the first user equipment;
each of the one or more second indications of the one or more second signal time delays indicates a respective calibrated transmit signal time delay of a respective one of the one or more assistance devices;

the plurality of RFFPs comprise:
  a first RFFP based on a first plurality of measurements of a first uplink signal from the target device to the transmission/reception point; and
  one or more second RFFPs each based on a respective second plurality of measurements of a respective second uplink signal from a respective one of the one or more assistance devices to the transmission/reception point; and
  the at least one first indication of the at least one first signal time delay indicates a transmit signal time delay of the target device.

Clause 45. The non-transitory, processor-readable storage medium of clause 38, wherein:
the apparatus is a network entity;
the plurality of wireless signal transfer devices comprise a user equipment;
the target device comprises a first transmission/reception point;
the one or more assistance devices comprise one or more second transmission/reception points, wherein each of the one or more second transmission/reception points has a respective known timing relationship with respect to the first transmission/reception point;
each of the one or more second indications of the one or more second signal time delays indicates a respective calibrated receive signal time delay of a respective one of the one or more assistance devices;
the plurality of RFFPs comprise:
  a first RFFP based on a first plurality of measurements of a first uplink signal from the user equipment to the target device; and
  one or more second RFFPs each based on a respective second plurality of measurements of a respective second uplink signal from the user equipment to a respective one of the one or more assistance devices; and
  the at least one first indication of the at least one first signal time delay indicates a receive signal time delay of the target device.

Clause 46. The non-transitory, processor-readable storage medium of clause 38, wherein:
the apparatus is a network entity;
the plurality of wireless signal transfer devices comprise a transmission/reception point;
the target device comprises a first user equipment;
the one or more assistance devices comprise one or more second user equipments, wherein each of the one or more second user equipments has a respective known timing relationship with respect to the first user equipment;
each of the one or more second indications of the one or more second signal time delays indicates a respective calibrated receive signal time delay of a respective one of the one or more assistance devices;
the plurality of RFFPs comprise:
  a first RFFP based on a first plurality of measurements of a first downlink signal from the transmission/reception point to the target device; and
  one or more second RFFPs each based on a respective second plurality of measurements of a respective second downlink signal from the transmission/reception point to a respective one of the one or more assistance devices; and
  the at least one first indication of the at least one first signal time delay indicates a receive signal time delay of the target device.

Clause 47. The non-transitory, processor-readable storage medium of clause 37, wherein:
the plurality of wireless signal transfer devices comprise a measurement device;
the one or more assistance devices comprise a transmission device;
the plurality of RFFPs comprise:
  a first RFFP based on a first plurality of measurements of a first signal from the target device to the measurement device; and
  a second RFFP based on a second plurality of measurements of a second signal from the transmission device to the measurement device; and
  the at least one first indication of the at least one first signal time delay indicates a relative transmit signal time delay of the target device relative to the transmission device.

Clause 48. The non-transitory, processor-readable storage medium of clause 37, wherein:
the plurality of wireless signal transfer devices comprise a transmission device;
the one or more assistance devices comprise a measurement device;
the plurality of RFFPs comprise:
  a first RFFP based on a first plurality of measurements of a first signal from the transmission device to the target device; and
  a second RFFP based on a second plurality of measurements of a second signal from the transmission device to the measurement device; and
  the at least one first indication of the at least one first signal time delay indicates a relative transmit signal time delay of the target device relative to the transmission device.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of 20% or ±10%, ±5%, or +0.10% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of 20% or 10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:
a receiver;
a memory; and
a processor, communicatively coupled to the receiver and the memory, configured to:
obtain a plurality of RFFPs (radio frequency fingerprints) each based on a plurality of signal measurements of respective signals transferred between respective ones of a plurality of wireless signal transfer devices including a target device;
obtain a plurality of locations corresponding to the plurality of wireless signal transfer devices; and
implement machine-learning to provide at least one first indication of at least one first signal time delay based on the plurality of RFFPs and the plurality of locations, the at least one first signal time delay being an amount of time for components of the apparatus to convert between a first wireless signal at the target device and a first baseband signal at the target device.

2. The apparatus of claim 1, wherein the processor is further configured to:
obtain one or more second indications of one or more one second signal time delays to convert respectively, at each of one or more assistance devices of the plurality of wireless signal transfer devices other than the target device, between a second wireless signal and a second baseband signal; and
implement the machine-learning to provide the at least one first indication of the at least one first signal time delay based further on the one or more second indications of the one or more second signal time delays.

3. The apparatus of claim 2, wherein:
the plurality of RFFPs include: (1) one or more first RFFPs based on one or more first signal measurements of one or more first signals wirelessly transferred from the one or more assistance devices respectively to the target device; and (2) one or more second RFFPs based on one or more second signal measurements of one or more second signals wirelessly transferred from the target device to the one or more assistance devices respectively;
the at least one first indication of the at least one first signal time delay indicates a first receive/transmit signal time delay of the target device; and
each the one or more second indications of the one or more second signal time delays indicates a respective second receive/transmit signal time delay of each of a respective one of the one or more assistance devices.

4. The apparatus of claim 3, wherein the processor is further configured to:
obtain a third indication of an uncalibrated receive/transmit signal time delay of the target device or a partially-calibrated receive/transmit signal time delay of the target device; and
implement the machine-learning to provide the at least one first indication of the at least one first signal time delay based further on the third indication.

5. The apparatus of claim 2, wherein:
the apparatus is a network entity;
the one or more assistance devices comprise one or more user equipments;
the target device comprises a transmission/reception point;

each of the one or more second indications of the one or more second signal time delays indicates a respective calibrated receive/transmit signal time delay of a respective one of the one or more assistance devices; and
the plurality of RFFPs comprise, for each combination of the target device and a respective one of the one or more assistance devices, a first RFFP based on a first plurality of measurements of a downlink signal from the target device to the respective assistance device and a second RFFP based on a second plurality of measurements of an uplink signal from the respective assistance device to the target device.

6. The apparatus of claim 2, wherein:
the apparatus is a network entity;
the one or more assistance devices comprise one or more transmission/reception points;
the target device comprises a user equipment;
each of the one or more second indications of the one or more second signal time delays indicates a respective calibrated receive/transmit signal time delay of a respective one of the one or more assistance devices; and
the plurality of RFFPs comprise, for each combination of the target device and a respective one of the one or more assistance devices, a first RFFP based on a first plurality of measurements of an uplink signal from the target device to the respective assistance device and a second RFFP based on a second plurality of measurements of a downlink signal from the respective assistance device to the target device.

7. The apparatus of claim 2, wherein:
the apparatus is a network entity;
the plurality of wireless signal transfer devices comprise a user equipment;
the target device comprises a first transmission/reception point;
the one or more assistance devices comprise one or more second transmission/reception points, wherein each of the one or more second transmission/reception points has a respective known timing relationship with respect to the first transmission/reception point;
each of the one or more second indications of the one or more second signal time delays indicates a respective calibrated transmit signal time delay of a respective one of the one or more assistance devices;
the plurality of RFFPs comprise:
a first RFFP based on a first plurality of measurements of a first downlink signal from the target device to the user equipment; and
one or more second RFFPs each based on a respective second plurality of measurements of a respective second downlink signal from a respective one of the one or more assistance devices to the user equipment; and
the at least one first indication of the at least one first signal time delay indicates a transmit signal time delay of the target device.

8. The apparatus of claim 2, wherein:
the apparatus is a network entity;
the plurality of wireless signal transfer devices comprise a transmission/reception point;
the target device comprises a first user equipment;
the one or more assistance devices comprise one or more second user equipments, wherein each of the one or more second user equipments has a respective known timing relationship with respect to the first user equipment;

each of the one or more second indications of the one or more second signal time delays indicates a respective calibrated transmit signal time delay of a respective one of the one or more assistance devices;

the plurality of RFFPs comprise:
a first RFFP based on a first plurality of measurements of a first uplink signal from the target device to the transmission/reception point; and
one or more second RFFPs each based on a respective second plurality of measurements of a respective second uplink signal from a respective one of the one or more assistance devices to the transmission/reception point; and the at least one first indication of the at least one first signal time delay indicates a transmit signal time delay of the target device.

9. The apparatus of claim 2, wherein:
the apparatus is a network entity;
the plurality of wireless signal transfer devices comprise a user equipment;
the target device comprises a first transmission/reception point;
the one or more assistance devices comprise one or more second transmission/reception points, wherein each of the one or more second transmission/reception points has a respective known timing relationship with respect to the first transmission/reception point;
each of the one or more second indications of the one or more second signal time delays indicates a respective calibrated receive signal time delay of a respective one of the one or more assistance devices;
the plurality of RFFPs comprise:
a first RFFP based on a first plurality of measurements of a first uplink signal from the user equipment to the target device; and
one or more second RFFPs each based on a respective second plurality of measurements of a respective second uplink signal from the user equipment to a respective one of the one or more assistance devices; and
the at least one first indication of the at least one first signal time delay indicates a receive signal time delay of the target device.

10. The apparatus of claim 2, wherein:
the apparatus is a network entity;
the plurality of wireless signal transfer devices comprise a transmission/reception point;
the target device comprises a first user equipment;
the one or more assistance devices comprise one or more second user equipments, wherein each of the one or more second user equipments has a respective known timing relationship with respect to the first user equipment;
each of the one or more second indications of the one or more second signal time delays indicates a respective calibrated receive signal time delay of a respective one of the one or more assistance devices;
the plurality of RFFPs comprise:
a first RFFP based on a first plurality of measurements of a first downlink signal from the transmission/reception point to the target device; and
one or more second RFFPs each based on a respective second plurality of measurements of a respective second downlink signal from the transmission/reception point to a respective one of the one or more assistance devices; and
the at least one first indication of the at least one first signal time delay indicates a receive signal time delay of the target device.

11. The apparatus of claim 1, wherein:
the plurality of wireless signal transfer devices comprise a measurement device;
the one or more assistance devices comprise a transmission device;
the plurality of RFFPs comprise:
a first RFFP based on a first plurality of measurements of a first signal from the target device to the measurement device; and
a second RFFP based on a second plurality of measurements of a second signal from the transmission device to the measurement device; and
the at least one first indication of the at least one first signal time delay indicates a relative transmit signal time delay of the target device relative to the transmission device.

12. The apparatus of claim 1, wherein:
the plurality of wireless signal transfer devices comprise a transmission device;
the one or more assistance devices comprise a measurement device;
the plurality of RFFPs comprise:
a first RFFP based on a first plurality of measurements of a first signal from the transmission device to the target device; and
a second RFFP based on a second plurality of measurements of a second signal from the transmission device to the measurement device; and
the at least one first indication of the at least one first signal time delay indicates a relative transmit signal time delay of the target device relative to the transmission device.

13. A signal time delay estimation method comprising:
obtaining, at an apparatus, a plurality of RFFPs (radio frequency fingerprints) each based on a plurality of signal measurements of respective signals transferred between respective ones of a plurality of wireless signal transfer devices including a target device;
obtaining, at the apparatus, a plurality of locations corresponding to the plurality of wireless signal transfer devices; and
implementing, at the apparatus, machine-learning to provide at least one first indication of at least one first signal time delay based on the plurality of RFFPs and the plurality of locations, the at least one first signal time delay being an amount of time for components of the apparatus to convert between a first wireless signal at the target device and a first baseband signal at the target device.

14. The signal time delay estimation method of claim 13, further comprising obtaining, at the apparatus, one or more second indications of one or more one second signal time delays to convert respectively, at each of one or more assistance devices of the plurality of wireless signal transfer devices other than the target device, between a second wireless signal and a second baseband signal, wherein the machine-learning algorithm is implemented to provide the at least one first indication of the at least one first signal time delay based further on the one or more second indications of the one or more second signal time delays.

15. The signal time delay estimation method of claim 14, wherein:
  the plurality of RFFPs include: (1) one or more first RFFPs based on one or more first signal measurements of one or more first signals wirelessly transferred from the one or more assistance devices respectively to the target device; and (2) one or more second RFFPs based on one or more second signal measurements of one or more second signals wirelessly transferred from the target device to the one or more assistance devices respectively;
  the at least one first indication of the at least one first signal time delay indicates a first receive/transmit signal time delay of the target device; and
  each the one or more second indications of the one or more second signal time delays indicates a respective second receive/transmit signal time delay of each of a respective one of the one or more assistance devices.

16. The signal time delay estimation method of claim 15, further comprising obtaining, at the apparatus, a third indication of an uncalibrated receive/transmit signal time delay of the target device or a partially-calibrated receive/transmit signal time delay of the target device, wherein the machine-learning is implemented to provide the at least one first indication of the at least one first signal time delay based further on the third indication.

17. The signal time delay estimation method of claim 14, wherein:
  the apparatus is a network entity;
  the one or more assistance devices comprise one or more user equipments;
  the target device comprises a transmission/reception point;
  each of the one or more second indications of the one or more second signal time delays indicates a respective calibrated receive/transmit signal time delay of a respective one of the one or more assistance devices; and
  the plurality of RFFPs comprise, for each combination of the target device and a respective one of the one or more assistance devices, a first RFFP based on a first plurality of measurements of a downlink signal from the target device to the respective assistance device and a second RFFP based on a second plurality of measurements of an uplink signal from the respective assistance device to the target device.

18. The signal time delay estimation method of claim 14, wherein:
  the apparatus is a network entity;
  the one or more assistance devices comprise one or more transmission/reception points;
  the target device comprises a user equipment;
  each of the one or more second indications of the one or more second signal time delays indicates a respective calibrated receive/transmit signal time delay of a respective one of the one or more assistance devices; and
  the plurality of RFFPs comprise, for each combination of the target device and a respective one of the one or more assistance devices, a first RFFP based on a first plurality of measurements of an uplink signal from the target device to the respective assistance device and a second RFFP based on a second plurality of measurements of a downlink signal from the respective assistance device to the target device.

19. The signal time delay estimation method of claim 14, wherein:
  the apparatus is a network entity;
  the plurality of wireless signal transfer devices comprise a user equipment;
  the target device comprises a first transmission/reception point;
  the one or more assistance devices comprise one or more second transmission/reception points, wherein each of the one or more second transmission/reception points has a respective known timing relationship with respect to the first transmission/reception point;
  each of the one or more second indications of the one or more second signal time delays indicates a respective calibrated transmit signal time delay of a respective one of the one or more assistance devices;
  the plurality of RFFPs comprise:
    a first RFFP based on a first plurality of measurements of a first downlink signal from the target device to the user equipment; and
    one or more second RFFPs each based on a respective second plurality of measurements of a respective second downlink signal from a respective one of the one or more assistance devices to the user equipment; and
  the at least one first indication of the at least one first signal time delay indicates a transmit signal time delay of the target device.

20. The signal time delay estimation method of claim 14, wherein:
  the apparatus is a network entity;
  the plurality of wireless signal transfer devices comprise a transmission/reception point;
  the target device comprises a first user equipment;
  the one or more assistance devices comprise one or more second user equipments, wherein each of the one or more second user equipments has a respective known timing relationship with respect to the first user equipment;
  each of the one or more second indications of the one or more second signal time delays indicates a respective calibrated transmit signal time delay of a respective one of the one or more assistance devices;
  the plurality of RFFPs comprise:
    a first RFFP based on a first plurality of measurements of a first uplink signal from the target device to the transmission/reception point; and
    one or more second RFFPs each based on a respective second plurality of measurements of a respective second uplink signal from a respective one of the one or more assistance devices to the transmission/reception point; and
  the at least one first indication of the at least one first signal time delay indicates a transmit signal time delay of the target device.

21. The signal time delay estimation method of claim 14, wherein:
  the apparatus is a network entity;
  the plurality of wireless signal transfer devices comprise a user equipment;
  the target device comprises a first transmission/reception point;
  the one or more assistance devices comprise one or more second transmission/reception points, wherein each of the one or more second transmission/reception points has a respective known timing relationship with respect to the first transmission/reception point;
  each of the one or more second indications of the one or more second signal time delays indicates a respective calibrated receive signal time delay of a respective one of the one or more assistance devices;
the plurality of RFFPs comprise:
a first RFFP based on a first plurality of measurements of a first uplink signal from the user equipment to the target device; and
one or more second RFFPs each based on a respective second plurality of measurements of a respective second uplink signal from the user equipment to a respective one of the one or more assistance devices; and
the at least one first indication of the at least one first signal time delay indicates a receive signal time delay of the target device.

22. The signal time delay estimation method of claim 14, wherein:
the apparatus is a network entity;
the plurality of wireless signal transfer devices comprise a transmission/reception point;
the target device comprises a first user equipment;
the one or more assistance devices comprise one or more second user equipments, wherein each of the one or more second user equipments has a respective known timing relationship with respect to the first user equipment;
each of the one or more second indications of the one or more second signal time delays indicates a respective calibrated receive signal time delay of a respective one of the one or more assistance devices;
the plurality of RFFPs comprise:
a first RFFP based on a first plurality of measurements of a first downlink signal from the transmission/reception point to the target device; and
one or more second RFFPs each based on a respective second plurality of measurements of a respective second downlink signal from the transmission/reception point to a respective one of the one or more assistance devices; and
the at least one first indication of the at least one first signal time delay indicates a receive signal time delay of the target device.

23. The signal time delay estimation method of claim 13, wherein:
the plurality of wireless signal transfer devices comprise a measurement device;
the one or more assistance devices comprise a transmission device;
the plurality of RFFPs comprise:
a first RFFP based on a first plurality of measurements of a first signal from the target device to the measurement device; and
a second RFFP based on a second plurality of measurements of a second signal from the transmission device to the measurement device; and
the at least one first indication of the at least one first signal time delay indicates a relative transmit signal time delay of the target device relative to the transmission device.

24. The signal time delay estimation method of claim 13, wherein:
the plurality of wireless signal transfer devices comprise a transmission device;
the one or more assistance devices comprise a measurement device;
the plurality of RFFPs comprise:
a first RFFP based on a first plurality of measurements of a first signal from the transmission device to the target device; and
a second RFFP based on a second plurality of measurements of a second signal from the transmission device to the measurement device; and
the at least one first indication of the at least one first signal time delay indicates a relative transmit signal time delay of the target device relative to the transmission device.

25. An apparatus comprising:
means for obtaining a plurality of RFFPs (radio frequency fingerprints) each based on a plurality of signal measurements of respective signals transferred between respective ones of a plurality of wireless signal transfer devices including a target device;
means for obtaining a plurality of locations corresponding to the plurality of wireless signal transfer devices; and
means for implementing machine-learning algorithm to provide at least one first indication of at least one first signal time delay based on the plurality of RFFPs and the plurality of locations, the at least one first signal time delay being an amount of time for components of the apparatus to convert between a first wireless signal at the target device and a first baseband signal at the target device.

26. The apparatus of claim 25, further comprising means for obtaining one or more second indications of one or more one second signal time delays to convert respectively, at each of one or more assistance devices of the plurality of wireless signal transfer devices other than the target device, between a second wireless signal and a second baseband signal, wherein the means for implementing the machine-learning comprise means for implementing the machine-learning to provide the at least one first indication of the at least one first signal time delay based further on the one or more second indications of the one or more second signal time delays.

27. The apparatus of claim 26, wherein:
the plurality of RFFPs include: (1) one or more first RFFPs based on one or more first signal measurements of one or more first signals wirelessly transferred from the one or more assistance devices respectively to the target device; and (2) one or more second RFFPs based on one or more second signal measurements of one or more second signals wirelessly transferred from the target device to the one or more assistance devices respectively;
the at least one first indication of the at least one first signal time delay indicates a first receive/transmit signal time delay of the target device; and
each the one or more second indications of the one or more second signal time delays indicates a respective second receive/transmit signal time delay of each of a respective one of the one or more assistance devices.

28. A non-transitory, processor-readable storage medium comprising processor-readable instructions to cause a processor of an apparatus to:
obtain a plurality of RFFPs (radio frequency fingerprints) each based on a plurality of signal measurements of respective signals transferred between respective ones of a plurality of wireless signal transfer devices;
obtain a plurality of locations corresponding to the plurality of wireless signal transfer devices; and
implement machine-learning to provide at least one first indication of at least one first signal time delay based on the plurality of RFFPs and the plurality of locations, the at least one first signal time delay being an amount of time for components of the apparatus to convert between a first wireless signal at the target device and a first baseband signal at the target device.

29. The non-transitory, processor-readable storage medium of claim 28, further comprising processor-readable instructions to cause the processor to obtain one or more second indications of one or more one second signal time delays to convert respectively, at each of one or more assistance devices of the plurality of wireless signal transfer devices other than the target device, between a second wireless signal and a second baseband signal, wherein the processor-readable instructions to cause the processor to implement the machine-learning comprise processor-readable instructions to cause the processor to implement the machine-learning to provide the at least one first indication of the at least one first signal time delay based further on the one or more second indications of the one or more second signal time delays.

30. The non-transitory, processor-readable storage medium of claim 29, wherein:
- the plurality of RFFPs include: (1) one or more first RFFPs based on one or more first signal measurements of one or more first signals wirelessly transferred from the one or more assistance devices respectively to the target device; and (2) one or more second RFFPs based on one or more second signal measurements of one or more second signals wirelessly transferred from the target device to the one or more assistance devices respectively;
- the at least one first indication of the at least one first signal time delay indicates a first receive/transmit signal time delay of the target device; and
- each the one or more second indications of the one or more second signal time delays indicates a respective second receive/transmit signal time delay of each of a respective one of the one or more assistance devices.

\* \* \* \* \*